United States Patent
Mano et al.

(10) Patent No.: US 11,339,306 B2
(45) Date of Patent: May 24, 2022

(54) ACTIVE ENERGY RAY-CURABLE COATING COMPOSITION

(71) Applicant: NIPPON PAINT AUTOMOTIVE COATINGS CO., LTD., Osaka (JP)

(72) Inventors: Hirotsugu Mano, Hirakata (JP); Yugo Takemoto, Hirakata (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 162 days.

(21) Appl. No.: 16/642,977

(22) PCT Filed: Nov. 22, 2017

(86) PCT No.: PCT/JP2017/041987
§ 371 (c)(1),
(2) Date: Feb. 28, 2020

(87) PCT Pub. No.: WO2019/043962
PCT Pub. Date: Mar. 7, 2019

(65) Prior Publication Data
US 2020/0255686 A1 Aug. 13, 2020

(30) Foreign Application Priority Data
Aug. 30, 2017 (JP) .............................. JP2017-165453

(51) Int. Cl.
*C09D 133/14* (2006.01)
*C09D 7/61* (2018.01)
*B05D 3/06* (2006.01)

(52) U.S. Cl.
CPC ............. *C09D 133/14* (2013.01); *B05D 3/06* (2013.01); *C09D 7/61* (2018.01)

(58) Field of Classification Search
CPC .................. C09D 133/14; C09D 133/062; C09D 175/04; C09D 151/08; C09D 151/003; C09D 7/61; C09D 7/40; C09D 4/06; C08G 18/7571; C08G 18/7621; C08G 18/755; C08G 18/6692; C08G 18/6659; C08G 18/44; C08G 18/4269; C08G 18/4238; C08G 18/4018; C08G 18/348; C08G 18/12; C08G 18/10; C08G 18/0823; C08F 283/006; C08F 265/06; B05D 3/068; B05D 3/067; B05D 3/06; B05D 1/02
See application file for complete search history.

(56) References Cited

U.S. PATENT DOCUMENTS

| | | | |
|---|---|---|---|
| 5,260,361 A | 11/1993 | Fukushima et al. | |
| 5,449,702 A * | 9/1995 | Tayama | C09D 183/06 522/64 |
| 6,306,502 B1 * | 10/2001 | Fukushima | C09D 4/00 522/28 |
| 8,900,712 B2 * | 12/2014 | Mitsuoka | C08J 7/046 427/160 |
| 8,940,808 B2 * | 1/2015 | Mitsuoka | C08G 18/73 522/74 |
| 9,359,521 B2 * | 6/2016 | Takashima | C08K 5/3492 |
| 9,428,667 B2 * | 8/2016 | Takashima | C08J 7/0427 |
| 11,230,633 B2 * | 1/2022 | Oka | C08J 7/046 |
| 2017/0015774 A1 * | 1/2017 | Miyachi | B05D 1/305 |

FOREIGN PATENT DOCUMENTS

| | | | | |
|---|---|---|---|---|
| CN | 102686620 | | 9/2012 | |
| CN | 103497669 | | 1/2014 | |
| CN | 103497669 A | * | 1/2014 | |
| CN | 106103062 A | * | 11/2016 | ........... B29C 73/166 |
| CN | 106103602 | | 11/2016 | |
| EP | 0 543 393 | | 5/1993 | |
| JP | 2002-348499 | | 4/2002 | |
| JP | 2009-215452 | | 9/2009 | |
| JP | 2010-202877 | | 9/2010 | |
| JP | 2012-219138 | | 11/2012 | |
| JP | 2012-229331 | | 11/2012 | |
| JP | 2013-60552 | | 4/2013 | |
| JP | 2014-196410 | | 10/2014 | |
| WO | 2015/137279 | | 9/2015 | |
| WO | 2016/002399 | | 1/2016 | |

OTHER PUBLICATIONS

International Preliminary Report on Patentability dated Mar. 3, 2020 in International (PCT) Application No. PCT/JP2017/041987.
Extended European Search Report dated Apr. 30, 2021, in corresponding European Patent Application No. 17923135.2.
International Search Report (ISR) dated Jan. 9, 2018 in International (PCT) Application No. PCT/JP2017/041987.
Office Action dated Apr. 1, 2021 in corresponding Chinese Patent Application No. 201780094440.X.

* cited by examiner

Primary Examiner — Sanza L. McClendon
(74) Attorney, Agent, or Firm — Wenderoth, Lind & Ponack, L.L.P.

(57) ABSTRACT

An object of the present invention is to provide an active energy ray-curable coating composition including a specific resin component and at least one pigment (D) selected from the group consisting of a coloring pigment and a glitter pigment. The present invention provides an active energy ray-curable coating composition including a poly[(meth)acryloyloxyalkyl] isocyanurate (A); a polyfunctional (meth)acrylate (B) having 4 or more (meth)acrylate groups; an acrylic resin (C); and at least one pigment (D) selected from the group consisting of a coloring pigment and a glitter pigment, wherein the acrylic resin (C) has a weight-average molecular weight in the range of 5,000 to 30,000 and a solubility parameter in the range of 9.0 to 11.5.

13 Claims, No Drawings

ACTIVE ENERGY RAY-CURABLE COATING COMPOSITION

TECHNICAL FIELD

The present invention relates to an active energy ray-curable coating composition.

BACKGROUND ART

Articles such as industrial products often have coating films having various functions. For example, a plurality of coating films having various roles are formed sequentially on the surface of an object to be coated such as parts to constitute automobile bodies, and thus the object is protected and concurrently is provided with a beautiful appearance and a good design. In such coating of an object to be coated, especially the coating film formed on the front surface side greatly affects the appearance and design of the coated object. Therefore, such a coating film is strongly required to have a good coating film appearance. Furthermore, it is also strongly required to maintain a good coating film appearance for a long period of time, such as the durability and the discoloration resistance of a coating film.

As a coating composition for use for coating an object to be coated, for example, room temperature curable coating compositions, thermosetting coating compositions, etc. are widely used. For example, a room temperature curable coating composition, however, is problematic in that the production efficiency in the formation of a coating film is low because it takes a long time such as several hours to several days for the coating film to dry.

In contrast, a thermosetting coating composition undergoes curing of a coating film via a heating step, so that it is improved in production efficiency in the formation of a coating film as compared with a room temperature curable coating composition. However, a thermosetting step involves curing a coating film by heating an object to be coated, and therefore, there is a technical problem that an object having low heat resistance may be deformed during the heating step. Moreover, since the thermosetting step consumes a large amount of energy, this step is not preferable also from the viewpoint of energy saving and environmental load reduction.

Other methods for forming a coating film include a method for forming a coating film in which an ultraviolet-curable coating composition is used. The ultraviolet-curable coating compositions are high in production efficiency and, moreover, are advantageous in terms of energy saving and environmental load reduction because their curing reaction proceeds in a short time. Ultraviolet-curable coating compositions are advantageous also in that a coating film having a good appearance and being hard and high in scratch resistance can be formed therefrom. Therefore, ultraviolet-curable coating compositions are widely used in various fields such as personal computers and mobile phones.

However, despite many advantages as those described above, ultraviolet-curable coating compositions are not widely used as a coating material for objects to be coated such as parts to constitute automobile bodies. A conceivable reason for this is that an ultraviolet-curable coating composition forms a hard coating film structure derived from its highly crosslinking and polymerization as a result of its immediate reaction involving a high-speed chain reaction caused by the irradiation with ultraviolet rays after its application, so that the composition is inferior in impact resistance as well as in weatherability in a test where a cycle including light irradiation, cooling and heating is repeated.

The description of WO 2015/137279 A1 (Patent Literature 1) discloses an active energy ray-curable resin composition to be used for forming a cured film on a surface of a resin molded article for an automobile headlamp lens, comprising a mono or polypentaerythritol poly(meth)acrylate (A), a urethane (meth)acrylate mixture (B), and a poly[(meth)acryloyloxyalkyl] isocyanurate (C), wherein the (A) accounts for 10 to 70% by mass, the (B) accounts for 10 to 50% by mass, and the (C) accounts for 20 to 80% by mass per 100% by mass of the total amount of the (A), the (B) and the (C). Since this resin composition is designed for automobile headlamp lenses, it is required to be high in light transmittance and transparency.

CITATION LIST

Patent Literature

Patent Literature 1: WO 2015/137279 A1

SUMMARY OF THE INVENTION

Technical Problems

The present invention intends to solve the above-described conventional problems, and its object is to provide an active energy ray-curable coating composition comprising a specific resin component and at least one pigment (D) selected from the group consisting of a coloring pigment and a glitter pigment.

Solutions to Problems

The present invention provides the following aspects to solve the aforementioned problems.

[1]

An active energy ray-curable coating composition comprising:
a poly[(meth)acryloyloxyalkyl] isocyanurate (A),
a polyfunctional (meth)acrylate (B) having 4 or more (meth)acrylate groups,
an acrylic resin (C), and
at least one pigment (D) selected from the group consisting of a coloring pigment and a glitter pigment,
wherein the active energy ray-curable coating composition includes the component (A) in an amount of 40 to 80 parts by mass, the component (B) in an amount of 10 to 40 parts by mass, and the component (C) in an amount of 10 to 40 parts by mass per 100 parts by mass of the total amount of the components (A), (B) and (C), and
the acrylic resin (C) has a weight-average molecular weight in the range of 5,000 to 30,000, and a solubility parameter in the range of 9.0 to 11.5.

[2]

The active energy ray-curable coating composition,
wherein the amount of the pigment (D) contained in the active energy ray-curable coating composition is 0.0001 to 5 parts by mass per 100 parts by mass of the total amount of the components (A), (B) and (C).

[3]

The active energy ray-curable coating composition,
wherein the active energy ray-curable coating composition further comprises urethane (meth)acrylate (E), and
the active energy ray-curable coating composition includes the component (A) in an amount of 40 to 78 parts by mass, the component (B) in an amount of 10 to 40 parts by mass, the component (C) in an amount of 10 to 40 parts by mass, and the component (E) in an amount of 2 to 10 parts by mass per 100 parts by mass of the total amount of the components (A), (B), (C) and (E).

[4]

The active energy ray-curable coating composition, wherein the active energy ray-curable coating composition further comprises a di(meth)acrylate (F) having a saturated hydrocarbon group having 2 to 12 carbon atoms, and the active energy ray-curable coating composition includes the component (A) in an amount of 40 to 78 parts by mass, the component (B) in an amount of 10 to 40 parts by mass, the component (C) in an amount of 10 to 40 parts by mass, and the component (F) in an amount of 2 to 10 parts by mass per 100 parts by mass of the total amount of the components (A), (B), (C) and (F).

[5]

The active energy ray-curable coating composition, wherein the acrylic resin (C) has a glass transition temperature in the range of 50 to 110° C.

[6]

A method for forming a coating film comprising the step of applying the active energy ray-curable coating composition to an object to be coated and applying active energy rays thereto, wherein the coating film formed via the above step has a thickness in the range of 15 to 45 µm.

Effects of the Invention

The active energy ray-curable coating composition of the present invention contains a specific resin component and at least one pigment (D) selected from the group consisting of a coloring pigment and a glitter pigment. The active energy ray-curable coating composition of the present invention has good active energy ray curability, and a coating film obtained therefrom has advantages such as being superior in hiding subsurface property and smoothness.

DESCRIPTION OF EMBODIMENTS

First, the process leading to the present invention is described. The present inventors have aimed to develop an active energy ray-curable coating composition being applicable to an object to be coated such as parts to constitute an automobile body and containing a coloring pigment. For example, the purposes of the coating on the above-mentioned object to be coated include to improve the appearance and protect the surface from scratches, sunlight, etc., as well as to hide appearance defects such as scratches or molding marks which the object to be coated may have before coating and thereby prevent wasteful disposal of the object. For such a hiding purpose, a coating composition containing a coloring pigment is preferably used. Therefore, an attempt was made to develop an active energy ray-curable coating composition containing a coloring pigment.

It, however, has been found that simply mixing a coloring pigment in an existing active energy ray-curable coating composition causes decrease in active energy ray curability and uniform coating curability cannot be obtained. A coloring pigment is a substance having a function of making a human eye feel a color by selectively reflecting or absorbing light with a specific wavelength. Therefore, when a coloring pigment is contained in a coating composition, light with a specific wavelength is absorbed and active energy rays such as ultraviolet rays are also absorbed. Therefore, the active energy ray curability of the composition is reduced.

For an active energy ray-curable coating composition containing a coloring pigment having the above-mentioned technical problems, one conceivable method for improving the active energy ray curability may be a method that involves improving the dispersibility of the coloring pigment. This is because the active energy ray absorption of the coloring pigment itself in a coating film can be made uniform by highly dispersing the coloring pigment. However, experiments have revealed that it is difficult to uniformly disperse a coloring pigment by simply adding the coloring pigment to an existing active energy ray-curable coating composition and mixing and stirring them by an ordinary method, and as a result, sufficient active energy ray curability cannot be obtained and a resulting coating film will be poor in physical properties. The present invention is an invention accomplished as a result of various investigations aimed at solving such problems.

The active energy ray-curable coating composition of the present invention comprises:

a poly[(meth)acryloyloxyalkyl] isocyanurate (A), a polyfunctional (meth)acrylate (B) having 4 or more (meth)acrylate groups, an acrylic resin (C), and at least one pigment (D) selected from the group consisting of a coloring pigment and a glitter pigment. The acrylic resin (C) has a weight-average molecular weight in the range of 5,000 to 30,000 and a solubility parameter in the range of 9.0 to 11.5. In the following, the respective components are described.

Poly[(meth)acryloyloxyalkyl] isocyanurate (A)

The active energy ray-curable coating composition contains a poly[(meth)acryloyloxyalkyl] isocyanurate (A). The poly[(meth)acryloyloxyalkyl] isocyanurate (A) has a polymerization activity to be polymerized by irradiation with active energy rays. Moreover, it has the function of providing heat resistance to a cured product obtained by polymerization.

The poly[(meth)acryloyloxyalkyl] isocyanurate (A) is preferably a compound represented by the following formula.

[Chemical Formula 1]

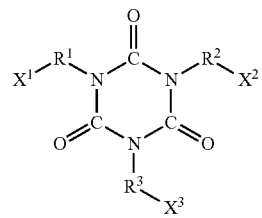

In the above formula, $X^1$, $X^2$ and $X^3$ are each independently a (meth)acryloyl group ($CH_2$=CR—CO—, wherein R represents a hydrogen atom or a methyl group), a hydrogen atom or an alkyl group having 1 to 12 carbon atoms, provided that at least two of $X^1$, $X^2$ and $X^3$ are (meth)acryloyl groups, and $R^1$, $R^2$ and $R^3$ each independently represent an oxyalkylene group having 1 to 4 carbon atoms.

Specific examples of the poly[(meth)acryloyloxyalkyl] isocyanurate (A) include, for example, bis(2-acryloyloxyethyl)hydroxyethyl isocyanurate, tris(2-acryloyloxyethyl) isocyanurate, bis(2-acryloyloxypropyl)hydroxyethyl isocyanurate, tris(2-acryloyloxypropyl) isocyanurate, bis(2-acryloyloxypropyl)hydroxypropyl isocyanurate, and the like.

The poly[(meth)acryloyloxyalkyl] isocyanurate (A) may be used singly or two or more thereof may be used in combination. When using two or more poly[(meth)acryloyloxyalkyl] isocyanurates (A), it is more preferable to use their combination containing a species with three (meth) acryloyl groups in a proportion of 50% by mass or more. More specifically, it is more preferable to use a combination containing a species with three (meth)acryloyl groups in a proportion of 70% by mass or more and a species with two (meth)acryloyl groups in a proportion of less than 30% by mass.

A commercially available product may be used as the poly[(meth)acryloyloxyalkyl] isocyanurate (A). Examples of such a commercially available product include FA-731A (tris(2-acryloyloxyethyl) isocyanurate) manufactured by Hitachi Chemical Co., Ltd., ARONIX M-315 (isocyanuric acid EO-modified di and triacrylate) manufactured by Toagosei Co., Ltd., and the like.

The amount of the poly[(meth)acryloyloxyalkyl] isocyanurate (A) contained in the active energy ray-curable coating composition is preferably in the range of 40 to 80 parts by mass, more preferably in the range of 50 to 70 parts by mass, per 100 parts by mass of the total amount of components (A), (B) and (C). By containing the component (A) in an amount of 40 parts by mass or more, good impact resistance and good weatherability can be obtained in a resulting coating film. Further, by containing the component (A) in an amount of 80 parts by mass or less, good abrasion resistance can be obtained.

Polyfunctional (meth)acrylate (B) having 4 or More (meth)acrylate Groups

The active energy ray-curable coating composition contains a polyfunctional (meth)acrylate (B) having 4 or more (meth)acrylate groups. The polyfunctional (meth)acrylate (B) having 4 or more (meth)acrylate groups described above exhibits good polymerization activity when irradiated with active energy rays. In addition, that the active energy ray-curable coating composition contains a polyfunctional (meth)acrylate (B) having 4 or more (meth)acrylate groups is advantageous in that a coating film having a high cross-linking density and superior scratch resistance can be obtained.

In the present description, the polyfunctional (meth)acrylate (B) having 4 or more (meth)acrylate groups does not encompass the urethane (meth)acrylate (E) described below. That is, the polyfunctional (meth)acrylate (B) having 4 or more (meth)acrylate groups does not encompass any (meth) acrylates having a urethane group.

The polyfunctional (meth)acrylate (B) can be prepared by making a polyhydric alcohol and (meth) acrylate undergo a dealcoholization reaction. Specific examples of the polyfunctional (meth)acrylate (B) include:

tetrafunctional (meth)acrylates such as pentaerythritol tetra(meth)acrylate, dipentaerythritol tetra(meth)acrylate, tripentaerythritol tetra(meth)acrylate, and ditrimethylolpropane tetra(meth)acrylate;

pentafunctional (meth)acrylates such as dipentaerythritol penta(meth)acrylate and tripentaerythritol penta(meth)acrylate;

hexafunctional (meth)acrylates such as dipentaerythritol hexa(meth)acrylate and tripentaerythritol hexa(meth)acrylate; and hepta or more functional (meth)acrylates such as tripentaerythritol hepta(meth)acrylate and tripentaerythritol octa (meth)acrylate.

The polyfunctional (meth)acrylate (B) may be used singly, or two or more species thereof may be used in combination.

The amount of the polyfunctional (meth)acrylate (B) contained in the active energy ray-curable coating composition is preferably within the range of 10 to 40 parts by mass, more preferably within the range of 13 to 30 parts by mass, and even more preferably within the range of 15 to 25 parts by mass, per 100 parts by mass of the total amount of the components (A), (B) and (C). By setting the amount of component (B) to 10 parts by mass or more, the abrasion resistance and chemical resistance of a resulting coating film can be improved. Further, that the amount of the component (B) is 40 parts by mass or less is advantageous in that the impact resistance of a resulting coating film can be kept good.

Acrylic Resin (C)

The active energy ray-curable coating composition contains an acrylic resin (C). The acrylic resin (C) has a weight-average molecular weight in the range of 5,000 to 30,000 and a solubility parameter in the range of 9.0 to 11.5. Owing to the specific acrylic resin (C) contained in the active energy ray-curable coating composition, it is possible to disperse a pigment (D) well in the active energy ray-curable coating composition. Thereby, even an active energy ray-curable coating composition containing a coloring pigment and/or a glitter pigment can secure good active energy ray curability.

Furthermore, that the weight-average molecular weight of the acrylic resin (C) is in the range of 5,000 to 30,000 is advantageous in that the viscosity of the coating composition and the balance of the physical properties of a resulting coating film such as the weatherability of the coating film can be kept in good ranges. In the present description, a weight-average molecular weight can be calculated from results measured by gel permeation chromatography (GPC) using polystyrene as a standard.

The acrylic resin (C) can be prepared by carrying out polymerization using one polymerizable monomer or two or more polymerizable monomers selected from among a polymerizable monomer having an acid group, a polymerizable monomer having a hydroxyl group, and other polymerizable monomers.

Examples of the polymerizable monomer having an acid group include polymerizable monomers having a carboxyl group, a sulfonic acid group, or the like. Examples of those having a carboxyl group include (meth)acrylic acid, crotonic acid, ethacrylic acid, propylacrylic acid, isopropylacrylic acid, itaconic acid, maleic anhydride, fumaric acid, and the like. Examples of the polymerizable monomer having a sulfonic acid group include t-butylacrylamidosulfonic acid, and the like. When using a polymerizable monomer having an acid group, it is preferable that some of acid groups are carboxyl groups.

Examples of the monomer having a hydroxyl group include hydroxyethyl (meth)acrylate, hydroxypropyl (meth) acrylate, hydroxybutyl (meth)acrylate, hydroxymethyl methacrylate, allyl alcohol, and an adduct of hydroxyethyl (meth)acrylate and ε-caprolactone.

Examples of other polymerizable monomers include:
alkyl (meth)acrylates such as methyl (meth)acrylate, ethyl (meth)acrylate, isopropyl (meth)acrylate, n-propyl (meth) acrylate, n-butyl (meth)acrylate., t-butyl (meth)acrylate, isobutyl (meth)acrylate, 2-ethylhexyl (meth)acrylate, n-octyl (meth)acrylate, lauryl (meth) acrylate, stearyl (meth) acrylate, and tridecyl methacrylate;

an addition reaction product of an oxirane compound having an alkyl group having 3 or more carbon atoms and acrylic acid or methacrylic acid;

styrene, α-methylstyrene, o-methylstyrene, m-methylstyrene, p-methylstyrene, p-t-butylstyrene, benzyl (meth)acrylate, esters of itaconic acid (dimethyl itaconate, etc.), esters of maleic acid (dimethyl maleate, etc.), esters of fumaric acid (dimethyl fumarate, etc.), acrylonitrile, methacrylonitrile, methyl isopropenyl ketone, vinyl acetate, VeoVa monomer (manufactured by Shell Chemicals, trade name), vinyl propionate, vinyl pivalate, ethylene, propylene, butadiene, N,N-dimethylaminoethyl acrylate, N,N-dimethylaminoethyl methacrylate, acrylamide, vinyl pyridine, etc.;

glycidyl group-containing unsaturated monomers such as glycidyl (meth)acrylate, and an addition reaction product of the glycidyl group-containing unsaturated monomer and fatty acid; and isocyanate group-containing unsaturated monomers such as m-isopropenyl-α,α-dimethylbenzyl isocyanate and isocyanatoethyl acrylate; and the like.

The method for preparing the acrylic resin (C) is not particularly limited, and for example, it can be carried out by solution polymerization such as ordinary radical polymerization, and the like. When the acrylic resin (C) is prepared by radical polymerization, it is preferable to use a radical polymerization initiator; and the like. Examples of the radical polymerization initiator include azo initiators such as 2,2'-azobisisobutyronitrile and 2,2'-azobis(2,4-dimethylvaleronitrile); hydrogen peroxide derivative-based initiators such as benzoyl peroxide, lauryl peroxide, t-butyl peroctoate, and t-butyl peroxy 2-ethylhexanoate. The amount of an initiator used is preferably 0.2 to 20 parts by mass, more preferably 0.5 to 10 parts by mass, per 100 parts by mass in total of the polymerizable monomers. As to the polymerization conditions in the radical polymerization reaction, the reaction can be performed under general polymerization conditions known to those skilled in the art.

The acrylic resin (C) is characterized in that its solubility parameter (SP value) is in the range of 9.0 to 11.5. The solubility parameter (SP value) is more preferably in the range of 9.3 to 11.0. That the solubility parameter (SP value) of the acrylic resin (C) is in the above range is advantageous in that the pigment (D) can be well dispersed in the active energy ray-curable coating composition. The acrylic resin (C) is further advantageous in that an active energy ray-curable coating composition having good compatibility with the polyfunctional (meth)acrylate (B) and good coating stability can be obtained.

The SP value as referred to herein is an abbreviation of solubility parameter and is a measure of solubility. The larger the SP value, the higher the polarity, whereas the smaller the value thereof, the lower the polarity.

For example, the SP value can be measured by the following method [reference: SUH, CLARKE, J. P. S. A-1, 5, 1671-1681 (1967)].

Measurement temperature: 20° C.

A sample: 0.5 g of resin is weighed in a 100 ml beaker, 10 ml of a good solvent is added with a volumetric pipette, and the resin is dissolve with a magnetic stirrer.

Solvent:

Good solvent . . . dioxane, acetone, etc.

Poor solvent . . . n-hexane, ion exchanged water, etc.

Clouding point measurement: A poor solvent is dropped using a 50 ml burette, and the point at which turbidity occurs is taken as the amount of dropping.

The SP value δ of resin is given by the following equations.

$$\delta = (V_{ml}^{1/2}\delta_{ml} + V_{mh}^{1/2}\delta_{mh})/(V_{ml}^{1/2} + V_{mh}^{1/2})$$

$$V_m = V_1 V_2/(\varphi_1 V_2 + \varphi_2 V_1)$$

$$\delta_m = \varphi_1 \delta_1 + \varphi_2 \delta_2$$

Vi: the molecular volume of the solvent (ml/mol)

φi: the volume fraction of each solvent at the clouding point

δi: the SP value of the solvent ml: low SP poor solvent mixed system mh: high SP poor solvent mixed system The acrylic resin (C) preferably has a glass transition temperature in the range of 50 to 110° C. Owing to the glass transition temperature of the acrylic resin (C) of 50° C. or higher, the abrasion resistance of a resulting coating film can be secured. Further, that the glass transition temperature of the acrylic resin (C) is 110° C. or lower is advantageous in that the impact resistance and the appearance of a resulting coating film can be secured.

The glass transition temperature of the acrylic resin (C) can be measured by detecting a thermal change following the glass transition of the resin by using a differential scanning calorimeter. Examples of a differential scanning calorimeter that can be used include DSC220C manufactured by Seiko Instruments & Electronics Ltd, and the like.

The acrylic resin (C) preferably has an acid value of 0 to 80 mg KOH/g (solid content), more preferably 1 to 45 mg KOH/g, and further preferably 1 to 20 mg KOH/g. The acrylic resin (C) preferably has a hydroxyl value of 10 to 80 mg KOH/g (solid content), and more preferably 30 to 50 mg KOH/g (solid content). That the acid value and the hydroxyl value of the acrylic resin (C) are in the above ranges is advantageous in that good compatibility between the components (A) and (B) can be secured.

The acrylic resin (C) may have an active energy ray-curable unsaturated group as necessary. Examples of the active energy ray-curable unsaturated group include alkenes such as a vinyl group and an allyl group, an acryloyl group, and a methacryloyl group. That the acrylic resin (C) has such an active energy ray-curable unsaturated group is advantageous in that the compatibility between the component (B) and the acrylic resin (C) is improved, and the stability of the coating composition is improved, and the uniformity of a resulting coating film is improved.

When the acrylic resin (C) has an active energy ray-curable unsaturated group, the number of active energy ray-curable unsaturated groups is preferably 1 to 3 on average per molecule of the acrylic resin (C). That the number of the active energy ray-curable unsaturated groups is within the above range is preferable because it offers the above advantages and balance between physical performances, such as impact resistance, of a resulting coating film can be maintained good.

The acrylic resin having an active energy ray-curable unsaturated group can be produced by, for example, a method that involves copolymerizing a monomer mixture containing a glycidyl group-containing unsaturated monomer, and then making a polymerizable monomer having an acid group such as (meth)acrylic acid undergo an addition reaction, or a method that involves copolymerizing a monomer mixture containing a polymerizable monomer having an acid group, and then making a glycidyl group-containing unsaturated monomer such as glycidyl (meth)acrylate undergo an addition reaction.

The acrylic resin (C) may be used singly or two or more species thereof may be used in combination. As the acrylic resin (C), a commercially available product having a weight-average molecular weight in the range of 5,000 to 30,000 and a solubility parameter in the range of 9.0 to 11.5 may be used.

The amount of the acrylic resin (C) contained in the active energy ray-curable coating composition is preferably within the range of 10 to 40 parts by mass, more preferably within the range of 13 to 30 parts by mass, and even more preferably within the range of 15 to 25 parts by mass, per 100 parts by mass of the total amount of the components (A), (B) and (C). That the amount of the component (C) is 10 parts by mass or more is advantageous in that the pigment (D) can be dispersed well in the active energy ray-curable coating composition and the active energy ray curability and the impact resistance of the active energy ray-curable coating composition can be secured. Further, that the amount of the component (C) is 40 parts by mass or less is advantageous in that the abrasion resistance of a resulting coating film can be kept good.

Owing to the active energy ray-curable coating composition containing the acrylic resin (C), the impact resistance and the weatherability of a resulting coating film can be secured. This offers the advantage that the active energy ray-curable coating composition can afford good impact resistance and weatherability even if urethane acrylate, which may be used in, for example, ultraviolet ray-curable coating compositions, is not contained. In order to improve impact resistance and weatherability, urethane acrylate may be included in the ultraviolet curable coating composition. On the other hand, the inclusion of urethane acrylate tends to increase the viscosity of the coating composition, which may deteriorate the appearance of a coating film. The active energy ray-curable coating composition is advantageous in that, owing to the acrylic resin (C) contained therein, good impact resistance and weatherability can be obtained even if urethane acrylate is not contained or even if the content of urethane acrylate is small. Furthermore, the active energy ray-curable coating composition has the advantages of being good in impact resistance and weatherability and good in coating film appearance.

At Least One Pigment (D) Selected From the Group Consisting of Coloring Pigment and Glitter Pigment The active energy ray-curable coating composition contains at least one pigment (D) selected from the group consisting of a coloring pigment and a glitter pigment. That the active energy ray-curable coating composition contains the pigment (D) is advantageous in that the hiding property of a resulting coating film is improved and the composition can be applied to an object to be coated for various uses. The pigment (D) preferably contains at least a coloring pigment.

The a coloring pigment is a pigment having a chromatic color or an achromatic color. Such a coloring pigment is a pigment having a function of making a human eye feel a color by selectively reflecting or absorbing light of a specific wavelength. The glitter pigment is a pigment having a function of reflecting light due to its scale-like shape. Since such a coloring pigment and a glitter pigment have the function of absorbing/reflecting light, they also absorb/reflect active energy rays such as ultraviolet rays. Therefore, they are pigments having the property of reducing the active energy ray-curing performance of the active energy ray-curable coating composition. It is one of the features of the present invention that the active energy ray-curable coating composition contains such a coloring pigment and/or a glitter pigment.

Examples of the coloring pigment include inorganic coloring pigments such as titanium dioxide, carbon black, iron oxide and yellow iron oxide; various organic coloring pigments such as phthalocyanine pigments such as phthalocyanine blue and phthalocyanine green; azo pigments such as azo red, azo yellow and azo orange; quinacridone pigments such as quinacridone red, cinquasia red and cinquasia magenta; perylene pigments such as perylene red and perylene maroon; carbazole violet, anthrapyridine, flavanthrone yellow, isoindoline yellow, indanthrone blue, dibromanzathrone red, anthraquinone red, diketopyrrolopyrrole, and the like. The coloring pigment may also be a pigment treated by a treatment method such as surfactant treatment, resin dispersion treatment, and resin coating treatment.

Examples of the glitter pigment include scaly pigments having an average particle diameter (D50) of 2 to 50 µm and a thickness of 0.1 to 5 µm. Examples of the glitter pigment include glitter pigments of metal such as aluminum, copper, zinc, iron, nickel, tin, aluminum oxide and their alloys, interference mica pigments, white mica pigments, graphite pigments, glass flake pigments, and the like. These glitter pigments may be non-colored pigments or may be colored pigments. The glitter pigment may also be a glitter pigment treated by a treatment method such as phosphoric acid treatment, silica treatment, surfactant treatment, resin dispersion treatment, and resin coating treatment. As the glitter pigment, an aluminum pigment is preferably used.

In the present description, the average particle diameter means a volume-average particle diameter D50. The volume-average particle diameter D50 can be measured using a laser Doppler type particle size analyzer ("Microtrac UPA 150" manufactured by Nikkiso Co., Ltd.).

The amount of the pigment (D) contained in the active energy ray-curable coating composition is preferably 0.0001 to 5 parts by mass per 100 parts by mass of the total amount of the components (A), (B) and (C). When the amount of the pigment (D) is less than 0.0001 parts by mass, an effect such as coloring due to the addition of the pigment (D) cannot be obtained. Further, owing to the pigment (D) contained in an amount of 5 parts by mass or less, the active energy ray-curing performance of the active energy ray-curable coating composition can be secured.

The active energy ray-curable coating composition may contain other pigments other than the pigment (D) (that is, a coloring pigment and/or a glitter pigment) as necessary. Examples of such other pigments include extender pigments, antirust pigments and the like. Examples of the extender pigments include calcium carbonate, barium sulfate, clay, and talc. In the present description, extender pigments and antirust pigments as mentioned above, and the like are not included in the definition of the "pigment (D)". This is because the extender pigments and antirust pigments have a lower function of absorbing or reflecting active energy rays and less influence on active energy ray-curability than coloring pigments and glitter pigments.

Urethane (meth)acrylate (E)

The active energy ray-curable coating composition may further comprise urethane (meth)acrylate (E) as necessary. That the active energy ray-curable coating composition further comprises the urethane (meth)acrylate (E) in addition to the components (A) to (C) and the pigment (D) is advantageous in that a coating film having good weatherability, abrasion resistance, and chemical resistance can be obtained.

The urethane (meth)acrylate (E) can be prepared, for example, by an addition reaction between a hydroxyl group-containing (meth)acrylate compound and a polyisocyanate compound having two or more isocyanate groups in its molecule.

Examples of the hydroxyl group-containing (meth)acrylate compound include hydroxyethyl (meth) acrylate, glycerin di(meth)acrylate, pentaerythritol tri(meth)acrylate, dipentaerythritol penta(meth)acrylate, ditrimethylolpropane tri(meth)acrylate, and the like.

Examples of the polyisocyanate compound having two or more isocyanate groups in its molecule include isophorone diisocyanate, pentamethylene diisocyanate, hexamethylene diisocyanate, 4,4'-dicyclohexylmethane diisocyanate, norbornane diisocyanate, 1,3-bis(isocyanatomethyl)cyclohexane (cis-, trans-mixture), their nurate-type trimers, and the like. The polyisocyanate compound is more preferably a compound containing no aromatic ring from the viewpoint of the weatherability of a resulting coating film.

The addition reaction can be carried out under a reaction condition commonly used by those skilled in the art.

When the active energy ray-curable coating composition comprises the urethane (meth)acrylate (E), the contents of components (A), (B), (C) and (E) are preferably 40 to 78 parts by mass, 10 to 40 parts by mass, 10 to 40 parts by mass, and 2 to 10 parts by mass, respectively, and more preferably 50 to 70 parts by mass, 13 to 30 parts by mass, 13 to 30 parts by mass, and 2 to 5 parts by mass, respectively, per 100 parts by mass of the total amount of the components (A), (B), (C) and (E). In this case, the amount of the pigment (D) contained in the active energy ray-curable coating composition is preferably 0.0001 to 5 parts by mass per 100 parts by mass of the total amount of the components (A), (B), (C) and (E).

Di(meth)acrylate (F) having a saturated hydrocarbon group having 2 to 12 carbon atoms The active energy ray-curable coating composition may further comprise di(meth)acrylate (F) having a saturated hydrocarbon group having 2 to 12 carbon atoms, as necessary. That the active energy ray-curable coating composition further comprises the di(meth)acrylate (F) having a saturated hydrocarbon group having 2 to 12 carbon atoms in addition to the components (A) to (C) and the pigment (D) is advantageous in that a coating film having good impact resistance can be obtained.

As the di(meth)acrylate (F) having a saturated hydrocarbon group having 2 to 12 carbon atoms, a compound having a saturated hydrocarbon group having 2 to 12 carbon atoms as a main skeleton and having (meth)acrylate groups at both ends thereof is suitably used.

Examples of the saturated hydrocarbon group having 2 to 12 carbon atoms that constitutes the main skeleton include linear, branched, or alicyclic saturated hydrocarbon groups having 2 to 12 carbon atoms. The alicyclic saturated hydrocarbon group having 2 to 12 carbon atoms may have an aliphatic branched structure and/or cyclic structure as necessary. That the saturated hydrocarbon group has 12 or less carbon atoms is advantageous in that good compatibility with the components (A) to (C) is secured.

The di(meth)acrylate (F) having a saturated hydrocarbon group having 2 to 12 carbon atoms can be prepared by, for example, reacting (meth)acrylic acid with a dialcohol having a saturated hydrocarbon group having 2 to 12 carbon atoms.

Examples of the di(meth)acrylate (F) having a saturated hydrocarbon group having 2 to 12 carbon atoms include 1,2-ethanediol di(meth)acrylate, 1,3-propanediol di(meth)acrylate, 1,2-propanediol di(meth)acrylate, 1,4-butanediol di(meth)acrylate, 1,3-butanediol di(meth)acrylate, 2,3-butanediol di(meth)acrylate, 1,5-pentanediol di(meth)acrylate, 1,4-pentanediol di(meth)acrylate, 1,3-pentanediol di(meth)acrylate, 1,2-pentanediol di(meth)acrylate, neopentyl glycol di(meth)acrylate, 1,6-hexanediol di(meth)acrylate, 1,7-heptanediol di(meth)acrylate, 1,8-octanediol di(meth)acrylate, 1,9-nonanediol di(meth)acrylate, 1,10-decanediol di(meth)acrylate, 1,11-undecanediol di(meth)acrylate, 1,12-dodecanediol di(meth)acrylate, 2-methyl-1,3-propanediol di(meth)acrylate, 3-methyl-1,5-pentanediol di(meth)acrylate, 2-methyl-1,8-octanediol di(meth)acrylate, 2,2-diethyl-1,3-propanediol di(meth)acrylate, tricyclodecane dimethanol di(meth)acrylate, and the like.

A commercially available product may be used as the di(meth)acrylate (F) having a saturated hydrocarbon group having 2 to 12 carbon atoms. Examples of such a commercially available product include LIGHT ACRYLATE and LIGHT ESTER manufactured by Kyoeisha Chemical Co., Ltd. (e.g., LIGHT ACRYLATE NP-A, LIGHT ACRYLATE NPD-A, LIGHT ACRYLATE 1.6HX-A, LIGHT ACRYLATE 1.9ND-A, LIGHT ACRYLATE DCP-A, LIGHT ESTER EG, LIGHT ESTER 1.4BG, LIGHT ESTER NP, LIGHT ESTER 1.6HX, LIGHT ESTER 1.9ND, LIGHT ACRYLATE DCP-A, and the like), bifunctional acrylates manufactured by Shin Nakamura Chemical Co., Ltd. (e.g., NK Ester A-DCP, NK Ester A-DOD-N, NK Ester A-HD-N, NK Ester A-NOD-N, NK Ester 1G, NK Ester DCP, NK Ester DOD-N, NK Ester HD-N, NK Ester NOD-N, and the like), and bifunctional acrylates manufactured by Daicel-Allnex Ltd. (e.g., HDDA, IRR 214-K, EBECRYL1130, and the like).

In the case where the active energy ray-curable coating composition contains a di(meth)acrylate (F) having a saturated hydrocarbon group having 2 to 12 carbon atoms, the contents of the components (A), (B), (C) and (F) are preferably 40 to 78 parts by mass, 10 to 40 parts, 10 to 40 parts by mass, and 2 to 10 parts by mass per 100 parts by mass of the total amount of (A), (B), (C) and (F), respectively, and more preferably 50 to 70 parts by mass, 13 to 30 parts by mass, 13 to 30 parts by mass, and 2 to 5 parts by mass, respectively. In this case, the amount of the pigment (D) contained in the active energy ray-curable coating composition is preferably 0.0001 to 5 parts by mass per 100 parts by mass of the total amount of the components (A), (B), (C) and (F).

Another embodiment of the active energy ray-curable coating composition is, for example, an embodiment including all of the components (A), (B), (C), (D), (E), and (F). In the embodiment, the contents of the components (A), (B), and (C) is preferably 40 to 76 parts by mass, 10 to 40 parts by mass, 10 to 40 parts by mass, respectively, and the total content of the components (E) and (F) is preferably 2 to 10 parts by mass, per 100 parts by mass of the total amount of (A), (B), (C) and (F).

Other Components

Preferably, the active energy ray-curable coating composition further comprises a photopolymerization initiator (G). Examples of the photopolymerization initiator (G) include alkylphenone-based photopolymerization initiators, acylphosphine oxide-based photopolymerization initiators, titanocene-based photopolymerization initiators, oxime ester-based polymerization initiators, and the like.

Examples of the alkylphenone-based photopolymerization initiator include 2,2-dimethoxy-1,2-diphenylethan-1-one, 1-hydroxy-cyclohexyl-phenyl-ketone, 2-hydroxy-2-methylpropiophenone, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]phenyl}-2-methyl-propan-1-one, 2-methyl-1-(4-methylthiophenyl)-2-morpholinopropan-1-one, 2-benzyl-2-dimethylamino-1-(4- morpholinophenyl)-butanone-1,2-(dimethylamino)-2-[(4-methylphenyl)methyl]-1-[4-(4-morpholinyl)phenyl]-1-butanone, and the like.

Examples of the acylphosphine oxide-based photopolymerization initiator include 2,4,6-trimethylbenzoyl-diphenyl-phosphine oxide, bis(2,4,6-trimethylbenzoyl)-phenylphosphine oxide, and the like.

Examples of the titanocene-based photopolymerization initiator include bis(η5-2,4-cyclopentadien-1-yl)-bis(2,6-difluoro-3-(1H-pyrrol-1-yl)-phenyl)titanium, and the like.

Examples of the oxime ester-based polymerization initiator include 1.2-octanedione, 1-[4-(phenylthio)-, 2-(O-benzoyloxime)], ethanone, 1-[9-ethyl-6-(2-methylbenzoyl)-9H-1-carbazol-3-yl]-, 1-(O-acetyloxime), oxyphenylacetic acid, 2-[2-oxo-2-phenylacetoxyethoxy]ethyl ester, 2-(2-hydroxyethoxy)ethyl ester, and the like.

Furthermore, a hydrogen extraction type initiator such as benzophenone, 2,4,6-trimethylbenzophenone, methyl benzoylbenzoate, 2,4-diethylthioxanthone, 2-ethylanthraquinone, and camphorquinone can also be used.

The content of the photopolymerization initiator (G) contained in the active energy ray-curable coating composition is preferably 0.1 to 10 parts by mass per 100 parts by mass of the total amount of the components (A), (B) and (C), or 100 parts by mass of the total amount of the components (A), (B), (C) and (E), or 100 parts by mass of the total amount of the components (A), (B), (C) and (F).

The active energy ray-curable coating composition may contain various additives such as a surface conditioner, a thickener, an antifoaming agent, a leveling agent, and an antioxidant as long as the object of the present invention is not impaired. One preferred embodiment of the active energy ray-curable coating composition is an embodiment containing no ultraviolet absorber as an additive.

The active energy ray-curable coating composition may contain an organic solvent as necessary. Examples of the organic solvent include hydrocarbons (e.g., xylene or toluene), alcohols (e.g., methyl alcohol, n-butyl alcohol, isopropyl alcohol, 2-ethylhexyl alcohol, ethylene glycol, and propylene glycol), ethers (e.g., ethylene glycol monoethyl ether, ethylene glycol monobutyl ether, ethylene glycol monohexyl ether, propylene glycol monoethyl ether, 3-methyl-3-methoxybutanol, diethylene glycol monoethyl ether, and diethylene glycol monobutyl ether), ketones (e.g., methyl isobutyl ketone, cyclohexanone, isophorone, and acetylacetone), esters (e.g., ethylene glycol monoethyl ether acetate and ethylene glycol monobutyl ether acetate), and mixtures thereof, and the like. Such an organic solvent can be used, for example, as a diluent or a viscosity modifier.

Preparation of Active Energy Ray-Curable Coating Composition

The active energy ray-curable coating composition can be prepared by mixing the above-described components. The means for mixing the above components and the mixing conditions are not particularly limited, and mixing means and mixing conditions that are commonly used by those skilled in the art can be used. Examples of the mixing means include a mixing means using a stirrer such as a homomixer, a homodisper or the like. The mixing conditions can be appropriately chosen according to the mixing means and the production scale. Examples of the mixing conditions include the condition in which the above components are added and mixed at 10 to 45° C. for 1 to 120 minutes, and the like.

Method for Forming Coating Film

A coating film can be formed by applying the active energy ray-curable coating composition to an object to be coated, and then applying active energy rays thereto.

Examples of the object to be coated in the above method include steel plates of metal such as iron, steel, stainless steel, aluminum, copper, zinc, and tin and alloys thereof; resins such as polyethylene resin, EVA resin, polyolefin resins (polyethylene resin, polypropylene resin, etc.), vinyl chloride resin, styrol resin, polyester resins (including PET resin, PBT resin, etc.), polycarbonate resin, acrylic resin, acrylonitrile-butadiene-styrene (ABS) resin, acrylonitrile-styrene (AS) resin, acrylonitrile-styrene-acryl (ASA) resin, polyamide resin, acetal resin, phenol resin, fluororesin, melamine resin, urethane resin, epoxy resin, and polyphenylene oxide (PPO); blend resins, which are mixtures of two or more of the resins mentioned above; various types of glass; and organic-inorganic hybrid materials. These may have been molded.

The steel plate may be in a state where an electrodeposition coating film is formed after being subjected to a chemical conversion treatment. Examples of the chemical conversion treatment include zinc phosphate chemical conversion treatment, zirconium chemical conversion treatment, chromic acid chemical conversion treatment, and the like. Examples of the electrodeposition coating film include electrodeposition coating films obtained by electrodeposition using a cationic electrodeposition coating composition or an anionic electrodeposition coating composition.

The above resin may, as necessary, have been subjected to vapor cleaning using an organic solvent or may have been subjected to cleaning using an aqueous solvent containing a detergent. Moreover, the resin may have been subjected to primer coating, as necessary. The above various types of glass also may, as necessary, be cleaned using an organic solvent such as alcohol, or may be cleaned using an aqueous solvent containing a detergent. Moreover, the resin may have been subjected to primer coating, as necessary.

As a method for applying the active energy ray-curable coating composition to an object to be coated, a coating method commonly used by those skilled in the art can be used. Examples of a coating method include a bar coater coating method, a Mayer bar coating method, an air knife coating method, a gravure coating method, a reverse gravure coating method, a micro gravure coating method, a brush coating method, a spray method, an air gun method, an air electrostatic gun method, a bell method, an air electrostatic bell method, a metallic bell method, a shower flow coating method, a dip coating method, a curtain coating method, an offset printing method, a flexographic printing method, a screen printing method, potting, and the like. The active energy ray-curable coating composition may be heated before its application to adjust its viscosity, as necessary.

The active energy ray-curable coating composition applied on the object to be coated is then cured by exposure to active energy ray irradiation, whereby a coating film is formed. In the present description, the term "photocurability" is used in a broad sense, and it means the property of curing when irradiated with electromagnetic waves such as X rays and y rays or active energy rays such as electron rays, proton rays and neutron rays, in addition to far ultraviolet rays, ultraviolet rays, near ultraviolet rays, and infrared rays. Among these, curing by ultraviolet irradiation is advantageous from the viewpoint of curing speed, availability of an irradiation apparatus, price, etc. Examples of the method of ultraviolet curing include a method involving about 100 to 5000 mJ/cm$^2$ irradiation using a high pressure mercury lamp, a metal halide lamp, a xenon lamp, a chemical lamp, an LED lamp or the like that emits light in a wavelength range of 200 to 500 nm. The active energy rays may be applied in the air or in an inert gas such as nitrogen, carbon dioxide, or argon.

The thickness of a coating film to be formed by the above process is preferably in the range of 15 to 45 µm, more preferably in the range of 15 to 40 µm, even more preferably in the range of 15 to 35 µm, and particularly preferably in the range of 20 to 30 µm. Since the active energy ray-curable coating composition is superior in active energy ray curability, the composition is advantageous in that it is possible to obtain a coating film superior in curability, abrasion resistance, impact resistance, etc. even in the above film thickness range, for example.

The active energy ray-curable coating composition has good active energy ray curability even though it contains at least one pigment (D) selected from the group consisting of a coloring pigment and a glitter pigment, and it is advantageous in that a resulting coating film is superior in hiding subsurface property and smoothness. The active energy ray-curable coating composition is further advantageous in that it can provide a coating film being superior in coating film properties such as abrasion resistance, impact resistance, weatherability, and the like. By using the active energy ray-curable coating composition, it is possible to form a coating film superior in coating film properties and coating film appearance by means for active energy ray curing. Therefore, the active energy ray-curable coating composition can be used suitably for coating of components to constitute automobile bodies, for example.

EXAMPLES

The present invention will be described hereafter in more detail by way of examples, to which the present invention is not intended to be limited. In the following examples, all designations of "part(s)" and "%" are on a mass basis, unless otherwise stated.

Production Example 1-1

Production of Acrylic Resin-A

A four-necked flask equipped with a heating device, a stirrer, a thermometer, a reflux condenser, a nitrogen inlet tube, and a dropping device was charged with 100 parts of butyl acetate and heated to 120° C. with stirring and introduction of nitrogen. Subsequently, a mixed solution of 61.2 parts of methyl methacrylate, 35 parts of n-butyl methacrylate, 2.3 parts of 2-hydroxyethyl methacrylate, 1.5 parts of methacrylic acid, and 2.5 parts of Kayaester-O, which is a polymerization initiator, was dropped from the dropping device over 3 hours. Subsequently, stirring was continued for 120 minutes to complete the reaction, and thus intended acrylic resin-A was obtained (resin solid content: 50%).

The weight-average molecular weight of the obtained acrylic resin-A was calculated from the result measured by gel permeation chromatography (GPC) using polystyrene as a standard and found to be 5200. The solubility parameter (SP value) was measured by the method described in the present description and found to be 10.5.

The glass transition temperature (Tg) of the acrylic resin A-1 was measured using a DSC (differential scanning calorimeter) manufactured by Seiko Instruments & Electronics Ltd. and found to be 71° C.

Production Examples 1-2 to 1-11

Production of Acrylic Resin-B to Acrylic Resin-K

Acrylic resins were obtained in the same manner as in Production Example 1-1, except that the components and/or their amounts of the mixed solution used for the polymerization were changed as shown in the following table.

The weight-average molecular weight, solubility parameter and glass transition temperature of the obtained acrylic resins were measured in the same manner as in Production Example 1-1. The results of the measurement are shown in the following table.

TABLE 1

| | Production Example 1-1 Acrylic resin-A | Production Example 1-2 Acrylic resin-B | Production Example 1-3 Acrylic resin-C | Production Example 1-4 Acrylic resin-D | Production Example 1-5 Acrylic resin-E | Production Example 1-6 Acrylic resin-F | Production Example 1-7 Acrylic resin-G | Production Example 1-8 Acrylic resin-H | Production Example 1-9 Acrylic resin-I | Production Example 1-10 Acrylic resin-J | Production Example 1-11 Acrylic resin-K |
|---|---|---|---|---|---|---|---|---|---|---|---|
| MMA | 61.2 | 15.1 | 32.6 | 60.6 | 62.0 | 74.2 | 60.6 | 60.6 | 60.6 | 3.0 | 61.7 |
| NBMA | 35.0 | 43.0 | 52.7 | 34.2 | 4.9 | | 34.2 | 34.2 | 34.2 | 45.2 | |
| EA | | | | | | 18.5 | | | | | 13.4 |
| TBMA | | | | | 29.3 | | | | | | |
| IBX | | 38.1 | | | | | | | | 48.0 | |
| MAA | 1.5 | 1.5 | 1.5 | 1.5 | 1.5 | 1.5 | 1.5 | 1.5 | 1.5 | 1.5 | 1.5 |
| HEMA | 2.3 | 2.3 | 13.2 | 3.7 | 2.3 | 5.8 | 3.7 | 3.7 | 3.7 | 2.3 | 23.4 |
| Photopolymerization initiator | 2.5 | 0.5 | 0.5 | 0.5 | 0.5 | 0.5 | 0.25 | 5 | 0.1 | 0.5 | 0.5 |
| Molecular weight (Mw) | 5200 | 14800 | 15100 | 15000 | 14900 | 15100 | 29800 | 3800 | 41000 | 15000 | 15200 |
| SP | 10.5 | 9.3 | 10.4 | 10.5 | 10.6 | 10.9 | 10.5 | 10.4 | 10.6 | 8.9 | 11.6 |
| Tg | 71 | 72 | 51 | 70 | 101 | 72 | 70 | 71 | 71 | 72 | 71 |
| Resin solid content (%) | 50 | 50 | 50 | 50 | 50 | 50 | 50 | 50 | 50 | 50 | 50 |

The components shown in the above table are as follows.
MMA: Methyl methacrylate
NBMA: n-Butyl methacrylate
EA: Ethyl acrylate
TBMA: tert-Butyl methacrylate
IBX: Isobornyl methacrylate
MAA: Methacrylic acid
HEMA: 2-Hydroxymethacrylate
Polymerization initiator: Kayaester-O (hydrogen peroxide polymerization initiator manufactured by Kayaku Akzo Corporation)

Production Examples 2-2 to 2-10

Production of Urethane Acrylates (2) to (10)

Urethane acrylates (2) to (10) were obtained in the same manner as in Production Example 2-1, except that the types of the isocyanate component and the hydroxyl group-containing (meth)acrylate compound as reaction raw materials were changed to those shown in the following table.

TABLE 2

| Urethane acrylate | | Reaction raw material | |
|---|---|---|---|
| No. | Number of functional groups | Isocyanate component | Hydroxyl group-containing (meth)acrylate compound |
| (1) | 3 | HDI nurate (DURANATE TPA-100, manufactured by Asahi Kasei Corp.) | 2-Hydroxyethyl acrylate (manufactured by Tokyo Chemical Industry Co., Ltd.) |
| (2) | 6 | HDI nurate (DURANATE TPA-100, manufactured by Asahi Kasei Corp.) | Glycerin dimethacrylate (manufactured by Tokyo Chemical Industry Co., Ltd.) |
| (3) | 9 | HDI nurate (DURANATE TPA-100, manufactured by Asahi Kasei Corp.) | Pentaerythritol triacrylate (Viscoat #300, manufactured by Osaka Organic Chemical Industry Ltd.) |
| (4) | 15 | HDI nurate (DURANATE TPA-100, manufactured by Asahi Kasei Corp.) | Dipentaerythritol pentaacrylate (NEOMER DA600, manufactured by Sanyo Chemical Industries, Ltd.) |
| (5) | 3 | IPDI nurate (VESTANT T1890/100, manufactured by Evonik Industries AG) | 2-Hydroxyethyl acrylate |
| (6) | 15 | IPDI nurate (VESTANT T1890/100, manufactured by Evonik Industries AG) | Dipentaerythritol pentaacrylate |
| (7) | 2 | Hexamethylene diisocyanate (manufactured by Tokyo Chemical Industry Co., Ltd.) | 2-Hydroxyethyl acrylate |
| (8) | 6 | Hexamethylene diisocyanate (manufactured by Tokyo Chemical Industry Co., Ltd.) | Pentaerythritol triacrylate |
| (9) | 2 | Isophorone diisocyanate (manufactured by Tokyo Chemical Industry Co., Ltd.) | 2-Hydroxyethyl acrylate |
| (10) | 6 | Isophorone diisocyanate (manufactured by Tokyo Chemical Industry Co., Ltd.) | Pentaerythritol triacrylate |

* HDI nurate: hexamethylene diisocyanate trimer isocyanurate
* IPDI nurate: isophorone diisocyanate trimer isocyanurate Production Example 2-1

Production of Urethane Acrylate (1)

A synthesis vessel equipped with a cooling tube, a stirrer, a dropping device, and a nitrogen introduction tube was charged with 100 parts of butyl acetate and 100 parts of DURANATE TPA-100 (trifunctional isocyanurate) manufactured by Asahi Kasei Corp.

In addition, 2-hydroxyethyl acrylate was added in an amount corresponding to 1 equivalent of monomer molecules per equivalent of isocyanate group, and 0.1 parts of dibutyltin dilaurate and dibutylhydroxytoluene in an amount corresponding to 0.1% per equivalent of 2-hydroxyethyl acrylate were added. The mixture was stirred and mixed at room temperature, and then reacted for 4 hours with stirring at 80° C. under a nitrogen atmosphere, and thus an intended urethane acrylate (1) (the number of functional groups: 3) was obtained.

Example 1

Preparation of Active Energy Ray-Curable Coating Composition

A stirring vessel was charged with 30 parts of butyl acetate, then 30 parts (in solid resin content) of acrylic resin-D as a component (C) and 1 part of carbon black (Mitsubishi Carbon Black, MA7) as a component (D) were added, which were stirred in the presence of bead mill to reach an almost uniform condition.

40 parts of a mixture of tris(2-acryloylethyl) isocyanurate and bis(2-acryloylethyl) isocyanurate (mixing ratio was tris (trifunctional) bis(bifunctional)=90:10) as a component (A), 30 parts of dipentaerythritol hexaacrylate as a component (B), 5 parts of 2-hydroxy-2-methylpropiophenone as a photopolymerization initiator (G), and 0.1 parts of BYK-306 manufactured by BYK-Chemie GmbH were added into the resulting mixture, and stirred to be uniform, and thus an active energy ray-curable coating composition was prepared.

Coating Film Formation

The active energy ray-curable coating composition obtained as described above was diluted in a Ford Cup #4 for 10 to 12 seconds using a thinner (an organic solvent containing ethyl acetate and propylene glycol monomethyl ether at 50:50) and then spray-coated on an ABS resin plate such that a film thickness after curing was 25 μm.

The resulting coated object was heated in a hot air drying oven at 80° C. for 5 minutes to volatilize the organic solvent in the composition.

Subsequently, a cured coating film was formed by applying ultraviolet rays with an integrated dose of 2000 mJ/cm$^2$ using a high-pressure mercury lamp (manufactured by Eye Graphics Co., Ltd., EYE Grantage (ECS-4011GX)) in the air.

As the actinometer for the application of ultraviolet rays, an EYE cumulative UV irradiation intensity tester UV METER UVPF-A1 (light receiving unit: 365 nm) manufactured by Eye Graphics Co., Ltd. was used.

Examples 2 to 74, Comparative Examples 1 to 45

Active energy ray-curable coating compositions were prepared in the same manner as in Example 1, except that the type and the amount of each component were changed as shown in the following table.

The aluminum paste used as a component (D) in Examples 18 and 19 was Alpaste MI-18801 (aluminum pigment manufactured by Asahi Kasei Corp.), which was used in an amount of 1 part in terms of pigment. In Example 18, the aluminum paste was additionally added when adding the component (A) and the component (B).

Cured coating films were formed in the same procedure as in Example 1 using the obtained active energy ray-curable coating compositions.

The active energy ray-curable coating compositions and the samples with the coating films were evaluated in the following procedures. The results obtained by these evaluation methods are shown in the following table.

Evaluation of Coating Film Appearance (Hiding Subsurface Property)

Before applying an active energy ray-curable coating composition, an ABS resin plate serving as an object to be coated was rubbed by 10 reciprocations of a Kanakin No. 3 cotton fabric in accordance with JIS L 0803 with a load of 20 g/cm$^2$, and thus the surface of the resin plate was scratched.

An active energy ray-curable coating composition was applied to the scratched surface in the same manner as in Example 1 to form a cured coating film.

The scratches formed on the surface of the object were observed visually from the above of the resulting cured coating film. The case where the scratches were hidden and not recognized was evaluated as ⊙, the case where the scratches were partially recognized was evaluated as Δ, and the case where the scratches were clearly recognized was evaluated as ×.

Evaluation of Coating Film Appearance (Smoothness)

The smoothness of a cured coating film was evaluated by measuring the arithmetic average roughness (Ra) of a roughness curve. The Ra value of a resulting cured coating film was measured in accordance with JIS B0601 using an evaluation type surface roughness tester (manufactured by Mitutoyo Corporation, SURFTEST SJ-201P). A sample with 2.5 mm-width cut-off (the number of partitions: 5) was measured seven times to give an Ra value in terms of top/bottom-trimmed mean. The obtained Ra value was evaluated according to the following criteria.

⊚: The Ra value was less than 0.2 μm.
○: The Ra value was 0.2 to 0.4 μm.
×: The Ra value exceeded 0.4 μm.

Evaluation of Abrasion Resistance

The cured coating films obtained in Examples and Comparative Examples were subjected to the evaluation of abrasion resistance in accordance with ISO 20566 using a car wash abrasion resistance tester (Amtec laboratory Car Wash apparatus, manufactured by Amtec Kistler GmbH).

A 20° gloss of a cured coating film before the abrasion test and a 20° gloss of the cured coating film after the abrasion test were measured using a gloss meter manufactured by BYK-Gardner.

A gloss retention rate was determined according to the following formula.

Gloss retention rate (%)=100×(20° gloss value after evaluation)/(initial 20° gloss value)

The obtained gloss retention rate was evaluated according to the following criteria.
○: The gloss retention rate was 80% or more (pass).
Δ: The gloss retention rate was 60% or more and less than 80% (unsuitable).
×: The gloss retention rate was less than 60% (unsuitable).

Evaluation of Impact Resistance

In accordance with JIS K5600-5-3, using an impact deformation tester (trade name "DuPont Type Impact Tester", manufactured by Toyo Seiki Seisaku-sho, Ltd.), a weight having a diameter of 0.5 inches and a weight of 0.5 kg was dropped on the ABS plate with the cured coating film obtained in each Example or Comparative Example on the front side of the coated surface from a height of 30 cm. According to the following criteria, the peeling condition of the coating film after the test was visually observed.

Judgment Criteria
○: No peeling occurred.
○Δ: Lifting of the coating film occurred around the impact area.
Δ: Peeling of the coating film occurred around the impact area.
×: Peeling of the coating film occurred entirely in the impact area.

Evaluation of Weatherability

The coating film obtained was subjected to an accelerated weatherability test (operating conditions: in accordance with JIS K 5400, operation time: 1,000 hours) by using a sunshine weatherometer (manufactured by Suga Test Instruments Co., Ltd.). The color of the coating film before and after the accelerated weatherability test was measured using a color difference meter CR-400 manufactured by Konica Minolta, Inc. to determine a color difference ΔE. The evaluation criteria are as follows.
○: The ΔE was less than 10.
Δ: The ΔE was 10 or more and less than 15.
×: The ΔE was 15 or more.

Evaluation of Curability (Surface Tack)

A 3 mm-thick ABS resin plate was spray-coated with an active energy ray-curable coating composition obtained such that a film thickness after curing was 25 μm. The resin plate was irradiated with energy with an integrated dose of 100 mJ/cm$^2$ per shot of irradiation.

The coating film irradiated with energy under the above-mentioned conditions was touched with a finger, and evaluation was performed on the basis of the number of times of irradiation performed until the coating composition no longer adhered to the finger (became tack-free).
○: The coating composition no longer adhered at the number of times of irradiation of 5 or less.
Δ: The coating composition no longer adhered at the number of times of irradiation of 5 or more and 10 or less.
×: The coating composition adhered even at the number of times of irradiation of 10 or more.

TABLE 3

| | | | | | Example | | | | | | | | |
|---|---|---|---|---|---|---|---|---|---|---|---|---|---|
| | | | | | 1 | 2 | 3 | 4 | 5 | 6 | 7 | 8 | 9 |
| (A) | | Trifunctional | Bifunctional | | | | | | | | | | |
| | Mixture of tris(2-acryloylethyl) isocyanurate and bis(2-acryloylethyl) isocyanurate | 90 75 | 10 25 | | 40 | 60 | 80 | 60 | 60 | 60 | 60 | 60 | 60 |
| | Trimethylolpropane triacrylate | 100 | | | | | | | | | | | |
| | Urethane acrylate (1) | 100 | | | | | | | | | | | |
| (B) | | Number of functional groups | | | | | | | | | | | |
| | Dipentaerythritol hexaacrylate | 6 | | | 30 | 20 | 10 | 20 | 20 | 20 | 20 | 20 | 20 |
| | Ditrimethylolpropane tetraacrylate | 4 | | | | | | | | | | | |
| | Pentaerythritol tetraacrylate | 4 | | | | | | | | | | | |
| | Trimethylolpropane triacrylate | 3 | | | | | | | | | | | |
| (C) | | Mw | SP | Tg | | | | | | | | | |
| | Acrylic resin-A | 5200 | 10.5 | 71 | | | | | | | | | |
| | Acrylic resin-B | 14800 | 9.3 | 72 | | | | | | | | | |
| | Acrylic resin-C | 15100 | 10.4 | 51 | | | | | | | | | |
| | Acrylic resin-D | 15000 | 10.5 | 70 | 30 | 20 | 10 | 20 | 20 | 20 | 20 | 20 | 20 |
| | Acrylic resin-E | 14900 | 10.6 | 101 | | | | | | | | | |
| | Acrylic resin-F | 15100 | 10.9 | 72 | | | | | | | | | |
| | Acrylic resin-G | 29800 | 10.5 | 70 | | | | | | | | | |
| | Acrylic resin-H | 3800 | 10.4 | 71 | | | | | | | | | |
| | Acrylic resin-I | 41000 | 10.6 | 71 | | | | | | | | | |
| | Acrylic resin-J | 15000 | 8.9 | 72 | | | | | | | | | |
| | Acrylic resin-K | 15200 | 11.6 | 71 | | | | | | | | | |
| | Total amount of components (A) to (C) | | | | 100 | 100 | 100 | 100 | 100 | 100 | 100 | 100 | 100 |
| (D) | Carbon black | | | | 1 | 1 | 1 | 0.001 | 5 | 1 | 1 | 5 | 1 |
| | Aluminum paste | | | | | | | | | | | | |
| (G) | 2-Hydroxy-2-methylpropiophenone | | | | 5 | 5 | 5 | 5 | 5 | 1 | 10 | 10 | 5 |
| Evaluation | Curability (surface tacking) | | | | ○ | ○ | ○ | ○ | ○ | ○ | ○ | ○ | ○ |
| | Coating film appearance (hiding subsurface property) | | | | ○ | ○ | ○ | ○ | ○ | ○ | ○ | ○ | ○ |
| | Coating film appearance (smoothness) | | | | ○ | ○ | ○ | ○ | ○ | ○ | ○ | ○ | ○ |
| | Abrasion resistance | | | | ○ | ○ | ○ | ○ | ○ | ○ | ○ | ○ | ○ |
| | Impact resistance | | | | ○ | ○ | ○ | ○ | ○ | ○ | ○ | ○ | ○ |
| | Weatherability (SWOM) | | | | ○ | ○ | ○ | ○ | ○ | ○ | ○ | ○ | ○ |
| Overall evaluation | | | | | ○ | ○ | ○ | ○ | ○ | ○ | ○ | ○ | ○ |

| | | | | | Example | | | | | | | | | |
|---|---|---|---|---|---|---|---|---|---|---|---|---|---|---|
| | | | | | 10 | 11 | 12 | 13 | 14 | 15 | 16 | 17 | 18 | 19 |
| (A) | | Trifunctional | Bifunctional | | | | | | | | | | | |
| | Mixture of tris(2-acryloylethyl) isocyanurate and bis(2-acryloylethyl) isocyanurate | 90 75 | 10 25 | | 60 | 60 | 60 | 60 | 60 | 60 | 60 | 60 | 60 | 60 |
| | Trimethylolpropane triacrylate | 100 | | | | | | | | | | | | |
| | Urethane acrylate (1) | 100 | | | | | | | | | | | | |
| (B) | | Number of functional groups | | | | | | | | | | | | |
| | Dipentaerythritol hexaacrylate | 6 | | | | | | 20 | 20 | 20 | 20 | 20 | 20 | 20 |
| | Ditrimethylolpropane tetraacrylate | 4 | | | 20 | | | | | | | | | |
| | Pentaerythritol tetraacrylate | 4 | | | | | 20 | | | | | | | |
| | Trimethylolpropane triacrylate | 3 | | | | | | | | | | | | |
| (C) | | Mw | SP | Tg | | | | | | | | | | |
| | Acrylic resin-A | 5200 | 10.5 | 71 | | | | 20 | | | | | | |
| | Acrylic resin-B | 14800 | 9.3 | 72 | | | | | 20 | | | | | |
| | Acrylic resin-C | 15100 | 10.4 | 51 | | | | | | 20 | | | | |
| | Acrylic resin-D | 15000 | 10.5 | 70 | 20 | 20 | | | | | | | 20 | 20 |
| | Acrylic resin-E | 14900 | 10.6 | 101 | | | | | | | 20 | | | |
| | Acrylic resin-F | 15100 | 10.9 | 72 | | | | | | | | 20 | | |
| | Acrylic resin-G | 29800 | 10.5 | 70 | | | | | | | | | 20 | |
| | Acrylic resin-H | 3800 | 10.4 | 71 | | | | | | | | | | |
| | Acrylic resin-I | 41000 | 10.6 | 71 | | | | | | | | | | |
| | Acrylic resin-J | 15000 | 8.9 | 72 | | | | | | | | | | |
| | Acrylic resin-K | 15200 | 11.6 | 71 | | | | | | | | | | |
| | Total amount of components (A) to (C) | | | | 100 | 100 | 100 | 100 | 100 | 100 | 100 | 100 | 100 | 100 |

TABLE 3-continued

|  |  |  |  |  |  |  |  |  |  |  |  |
|---|---|---|---|---|---|---|---|---|---|---|---|
| (D) | Carbon black | 1 | 1 | 1 | 1 | 1 | 1 | 1 | 1 |  | 1 |
|  | Aluminum paste |  |  |  |  |  |  |  |  | 1 | 1 |
| (G) | 2-Hydroxy-2-methylpropiophenone | 5 | 5 | 5 | 5 | 5 | 5 | 5 | 5 | 5 | 5 |
| Evaluation | Curability (surface tacking) | ○ | ○ | ○ | ○ | ○ | ○ | ○ | ○ | ○ | ○ |
|  | Coating film appearance (hiding subsurface property) | ○ | ○ | ○ | ○ | ○ | ○ | ○ | ○ | ○ | ○ |
|  | Coating film appearance (smoothness) | ○ | ○ | ○ | ○ | ○ | ○ | ○ | ○ | ○ | ○ |
|  | Abrasion resistance | ○ | ○ | ○ | ○ | ○ | ○ | ○ | ○ | ○ | ○ |
|  | Impact resistance | ○ | ○ | ○ | ○ | ○ | ○ | ○ | ○ | ○ | ○ |
|  | Weatherability (SWOM) | ○ | ○ | ○ | ○ | ○ | ○ | ○ | ○ | ○ | ○ |
| Overall evaluation |  | ○ | ○ | ○ | ○ | ○ | ○ | ○ | ○ | ○ | ○ |

TABLE 4

|  |  |  |  |  | Comparative Examples | | | | | | | | |
|---|---|---|---|---|---|---|---|---|---|---|---|---|---|
|  |  |  |  |  | 1 | 2 | 3 | 4 | 5 | 6 | 7 | 8 | 9 |
| (A) |  | Trifunctional | Bifunctional |  |  |  |  |  |  |  |  |  |  |
|  | Mixture of tris(2-acryloylethyl) isocyanurate and bis(2-acryloyethyl) isocyanurate | 90<br>75 | 10<br>25 |  | 20 | 20 | 20 | 60 | 60 | 90 | 40 | 40 | 60 |
|  | Trimethylolpropane triacrylate | 100 |  |  |  |  |  |  |  |  |  |  |  |
|  | Urethane acrylate (1) | 100 |  |  |  |  |  |  |  |  |  |  |  |
|  |  | Number of functional groups |  |  |  |  |  |  |  |  |  |  |  |
|  | Dipentaerythritol hexaacrylate | 6 |  |  | 40 | 60 | 20 | 5 | 35 | 5 | 50 | 10 | 20 |
|  | Ditrimethylolpropane tetraacrylate | 4 |  |  |  |  |  |  |  |  |  |  |  |
|  | Pentaerythritol tetraacrylate | 4 |  |  |  |  |  |  |  |  |  |  |  |
|  | Trimethylolpropane triacrylate | 3 |  |  |  |  |  |  |  |  |  |  |  |
| (C) |  | Mw | SP | Tg |  |  |  |  |  |  |  |  |  |
|  | Acrylic resin-A | 5200 | 10.5 | 71 |  |  |  |  |  |  |  |  |  |
|  | Acrylic resin-B | 14800 | 9.3 | 72 |  |  |  |  |  |  |  |  |  |
|  | Acrylic resin-C | 15100 | 10.4 | 51 |  |  |  |  |  |  |  |  |  |
|  | Acrylic resin-D | 15000 | 10.5 | 70 | 40 | 20 | 60 | 35 | 5 | 5 | 10 | 50 | 20 |
|  | Acrylic resin-E | 14900 | 10.6 | 101 |  |  |  |  |  |  |  |  |  |
|  | Acrylic resin-F | 15100 | 10.9 | 72 |  |  |  |  |  |  |  |  |  |
|  | Acrylic resin-G | 29800 | 10.5 | 70 |  |  |  |  |  |  |  |  |  |
|  | Acrylic resin-H | 3800 | 10.4 | 71 |  |  |  |  |  |  |  |  |  |
|  | Acrylic resin-I | 41000 | 10.6 | 71 |  |  |  |  |  |  |  |  |  |
|  | Acrylic resin-J | 15000 | 8.9 | 72 |  |  |  |  |  |  |  |  |  |
|  | Acrylic resin-K | 15200 | 11.6 | 71 |  |  |  |  |  |  |  |  |  |
|  | Total amount of components (A) to (C) |  |  |  | 100 | 100 | 100 | 100 | 100 | 100 | 100 | 100 | 100 |
| (D) | Carbon black |  |  |  | 1 | 1 | 1 | 1 | 1 | 1 | 1 | 1 | 0 |
| (G) | 2-Hydroxy-2-methylpropiophenone |  |  |  | 5 | 5 | 5 | 5 | 5 | 5 | 5 | 5 | 5 |
| Evaluation | Curability (surface tacking) |  |  |  | ○ | ○ | ○ | ○ | ○ | ○ | ○ | ○ |  |
|  | Coating film appearance (hiding subsurface property) |  |  |  | ○ | ○ | ○ | ○ | ○ | ○ | ○ | ○ | x |
|  | Coating film appearance (smoothness) |  |  |  | ○ | ○ | ○ | ○ | ○ | ○ | ○ | ○ | ○ |
|  | Abrasion resistance |  |  |  | ○ | ○ | x | x | ○ | x | ○ | x | ○ |
|  | Impact resistance |  |  |  | ○ | x | ○ | ○ | x | x | x | ○ | ○ |
|  | Weatherability (SWOM) |  |  |  | x | x | x | ○ | ○ | ○ | ○ | ○ | ○ |
| Overall evaluation |  |  |  |  | x | x | x | x | x | x | x | x | x |

|  |  |  |  |  | Comparative Examples | | | | | | |
|---|---|---|---|---|---|---|---|---|---|---|---|
|  |  |  |  |  | 10 | 11 | 12 | 13 | 14 | 15 | 16 |
| (A) |  | Trifunctional | Bifunctional |  |  |  |  |  |  |  |  |
|  | Mixture of tris(2-acryloylethyl) isocyanurate and bis(2-acryloyethyl) isocyanurate | 90<br>75 | 10<br>25 |  | 60 |  |  | 60 | 60 | 60 | 60 |
|  | Trimethylolpropane triacrylate | 100 |  |  |  | 60 |  |  |  |  |  |
|  | Urethane acrylate (1) | 100 |  |  |  |  | 60 |  |  |  |  |
|  |  | Number of functional groups |  |  |  |  |  |  |  |  |  |

TABLE 4-continued

| | | | | | | | | | | |
|---|---|---|---|---|---|---|---|---|---|---|
| | Dipentaerythritol hexaacrylate | 6 | | | 20 | 20 | 20 | 20 | 20 | 20 |
| | Ditrimethylolpropane tetraacrylate | 4 | | | | | | | | |
| | Pentaerythritol tetraacrylate | 4 | | | | | | | | |
| | Trimethylolpropane triacrylate | 3 | | 20 | | | | | | |
| (C) | | Mw | SP | Tg | | | | | | |
| | Acrylic resin-A | 5200 | 10.5 | 71 | | | | | | |
| | Acrylic resin-B | 14800 | 9.3 | 72 | | | | | | |
| | Acrylic resin-C | 15100 | 10.4 | 51 | | | | | | |
| | Acrylic resin-D | 15000 | 10.5 | 70 | 20 | 20 | 20 | | | |
| | Acrylic resin-E | 14900 | 10.6 | 101 | | | | | | |
| | Acrylic resin-F | 15100 | 10.9 | 72 | | | | | | |
| | Acrylic resin-G | 29800 | 10.5 | 70 | | | | | | |
| | Acrylic resin-H | 3800 | 10.4 | 71 | | | | 20 | | |
| | Acrylic resin-I | 41000 | 10.6 | 71 | | | | | 20 | |
| | Acrylic resin-J | 15000 | 8.9 | 72 | | | | | | 20 |
| | Acrylic resin-K | 15200 | 11.6 | 71 | | | | | | | 20 |
| | Total amount of components (A) to (C) | | | | 100 | 100 | 100 | 100 | 100 | 100 | 100 |
| (D) | Carbon black | | | | 1 | 1 | 1 | 1 | 1 | 1 | 1 |
| (G) | 2-Hydroxy-2-methylpropiophenone | | | | 5 | 5 | 5 | 5 | 5 | 5 | 5 |
| Evaluation | Curability (surface tacking) | | | | o | o | o | o | o | o | o |
| | Coating film appearance (hiding subsurface property) | | | | o | o | o | o | o | o | o |
| | Coating film appearance (smoothness) | | | | o | o | x | o | x | x | x |
| | Abrasion resistance | | | | x | o | o | o | x | x | x |
| | Impact resistance | | | | o | o | o | x | o | x | x |
| | Weatherability (SWOM) | | | | o | x | o | x | x | x | x |
| Overall evaluation | | | | | x | x | x | x | x | x | x |

TABLE 5

| | | | | | Example | | | | | | | | | | |
|---|---|---|---|---|---|---|---|---|---|---|---|---|---|---|---|
| | | | | | 20 | 21 | 22 | 23 | 24 | 25 | 26 | 27 | 28 | 29 | 30 |
| (A) | | Trifunctional | Bifunctional | | | | | | | | | | | | |
| | Mixture of tris(2-acryloylethyl) isocyanurate and bis(2-acryloylethyl) isocyanurate | 90 / 75 | 10 / 25 | | 40 | 60 | 76 | 60 | 60 | 46 | 46 | 60 | 60 | 60 | 60 |
| | Trimethylolpropane triacrylate | 100 | | | | | | | | | | | | | |
| | Urethane acrylate (1) | 100 | | | | | | | | | | | | | |
| (B) | | Number of functional groups | | | | | | | | | | | | | |
| | Dipentaerythritol hexaacrylate | 6 | | | 28 | 18 | 10 | 10 | 26 | 40 | 10 | 15 | 18 | 18 | 18 |
| | Ditrimethylolpropane tetraacrylate | 4 | | | | | | | | | | | | | |
| | Pentaerythritol tetraacrylate | 4 | | | | | | | | | | | | | |
| | Trimethylolpropane triacrylate | 3 | | | | | | | | | | | | | |
| (C) | | Mw | SP | Tg | | | | | | | | | | | |
| | Acrylic resin-A | 5200 | 10.5 | 71 | 28 | 18 | 10 | 26 | 10 | 10 | 40 | 15 | 18 | 18 | 18 |
| | Acrylic resin-B | 14800 | 9.3 | 72 | | | | | | | | | | | |
| | Acrylic resin-C | 15100 | 10.4 | 51 | | | | | | | | | | | |
| | Acrylic resin-D | 15000 | 10.5 | 70 | | | | | | | | | | | |
| | Acrylic resin-E | 14900 | 10.6 | 101 | | | | | | | | | | | |
| | Acrylic resin-F | 15100 | 10.9 | 72 | | | | | | | | | | | |
| | Acrylic resin-G | 29800 | 10.5 | 70 | | | | | | | | | | | |
| | Acrylic resin-H | 3800 | 10.4 | 71 | | | | | | | | | | | |
| | Acrylic resin-I | 41000 | 10.6 | 71 | | | | | | | | | | | |
| | Acrylic resin-J | 15000 | 8.9 | 72 | | | | | | | | | | | |
| | Acrylic resin-K | 15200 | 11.6 | 71 | | | | | | | | | | | |

TABLE 5-continued

| | | | | | | | | | | | | |
|---|---|---|---|---|---|---|---|---|---|---|---|---|
| (E) | 1,9-Nonanediol diacrylate | 4 | 4 | 4 | 4 | 4 | 4 | 4 | 10 | 4 | 4 | 4 |
| | 1,10-Decanediol diacrylate | | | | | | | | | | | |
| | Octadecane-1,12-diol diacrylate | | | | | | | | | | | |
| | 1,6-Hexanediol diacrylate | | | | | | | | | | | |
| | Tricyclodecanedimethanol diacrylate | | | | | | | | | | | |
| | Total amount of components (A) to (C) and (E) | 100 | 100 | 100 | 100 | 100 | 100 | 100 | 100 | 100 | 100 | 100 |
| (D) | Carbon black | 1 | 1 | 1 | 1 | 1 | 1 | 1 | 1 | 0.001 | 5 | 1 |
| (G) | 2-Hydroxy-2-methylpropiophenone | 5 | 5 | 5 | 5 | 5 | 5 | 5 | 5 | 5 | 5 | 1 |
| Evaluation | Curability (surface tacking) | ○ | ○ | ○ | ○ | ○ | ○ | ○ | ○ | ○ | ○ | ○ |
| | Coating film appearance (hiding subsurface property) | ○ | ○ | ○ | ○ | ○ | ○ | ○ | ○ | ○ | ○ | ○ |
| | Coating film appearance (smoothness) | ○ | ○ | ○ | ○ | ○ | ○ | ○ | ○ | ○ | ○ | ○ |
| | Abrasion resistance | ○ | ○ | ○ | ○ | ○ | ○ | ○ | ○ | ○ | ○ | ○ |
| | Impact resistance | ○ | ○ | ○ | ○ | ○ | ○ | ○ | ○ | ○ | ○ | ○ |
| | Weatherability (SWOM) | ○ | ○ | ○ | ○ | ○ | ○ | ○ | ○ | ○ | ○ | ○ |
| Overall evaluation | | ○ | ○ | ○ | ○ | ○ | ○ | ○ | ○ | ○ | ○ | ○ |

| | | Example | | | | | | | | | | | | | |
|---|---|---|---|---|---|---|---|---|---|---|---|---|---|---|---|
| | | 31 | 32 | 33 | 34 | 35 | 36 | 37 | 38 | 39 | 40 | 41 | 42 | 43 | 44 |
| (A) | Mixture of tris(2-acryloylethyl) isocyanurate and bis(2-acryloylethyl) isocyanurate | 60 | | 60 | 60 | 60 | 60 | 60 | 60 | 60 | 60 | 60 | 60 | 60 | 60 |
| | Trimethylolpropane triacrylate | | 60 | | | | | | | | | | | | |
| | Urethane acrylate (1) | | | | | | | | | | | | | | |
| (B) | Dipentaerythritol hexaacrylate | 18 | 18 | | | 18 | 18 | 18 | 18 | 18 | 18 | 18 | 18 | 18 | 18 |
| | Ditrimethylolpropane tetraacrylate | | | 18 | | | | | | | | | | | |
| | Pentaerythritol tetraacrylate | | | | 18 | | | | | | | | | | |
| | Trimethylolpropane triacrylate | | | | | | | | | | | | | | |
| (C) | Acrylic resin-A | 18 | 18 | 18 | 18 | | | | | | | 18 | 18 | 18 | 18 |
| | Acrylic resin-B | | | | | 18 | | | | | | | | | |
| | Acrylic resin-C | | | | | | 18 | | | | | | | | |
| | Acrylic resin-D | | | | | | | 18 | | | | | | | |
| | Acrylic resin-E | | | | | | | | 18 | | | | | | |
| | Acrylic resin-F | | | | | | | | | 18 | | | | | |
| | Acrylic resin-G | | | | | | | | | | 18 | | | | |
| | Acrylic resin-H | | | | | | | | | | | | | | |
| | Acrylic resin-I | | | | | | | | | | | | | | |
| | Acrylic resin-J | | | | | | | | | | | | | | |
| | Acrylic resin-K | | | | | | | | | | | | | | |
| (E) | 1,9-Nonanediol diacrylate | 4 | 4 | 4 | 4 | 4 | 4 | 4 | 4 | 4 | 4 | | | | |
| | 1,10-Decanediol diacrylate | | | | | | | | | | | 4 | | | |
| | Octadecane-1,12-diol diacrylate | | | | | | | | | | | | 4 | | |
| | 1,6-Hexanediol diacrylate | | | | | | | | | | | | | 4 | |
| | Tricyclodecanedimethanol diacrylate | | | | | | | | | | | | | | 4 |
| | Total amount of components (A) to (C) and (E) | 100 | 100 | 100 | 100 | 100 | 100 | 100 | 100 | 100 | 100 | 100 | 100 | 100 | 100 |
| (D) | Carbon black | 1 | 1 | 1 | 1 | 1 | 1 | 1 | 1 | 1 | 1 | 1 | 1 | 1 | 1 |
| (G) | 2-Hydroxy-2-methylpropiophenone | 10 | 5 | 5 | 5 | 5 | 5 | 5 | 5 | 5 | 5 | 5 | 5 | 5 | 5 |
| Evaluation | Curability (surface tacking) | ○ | ○ | ○ | ○ | ○ | ○ | ○ | ○ | ○ | ○ | ○ | ○ | ○ | ○ |
| | Coating film appearance (hiding subsurface property) | ○ | ○ | ○ | ○ | ○ | ○ | ○ | ○ | ○ | ○ | ○ | ○ | ○ | ○ |
| | Coating film appearance (smoothness) | ○ | ○ | ○ | ○ | ○ | ○ | ○ | ○ | ○ | ○ | ○ | ○ | ○ | ○ |

TABLE 5-continued

|  |  |  |  |  |  |  |  |  |  |  |  |  |  |  |  |
|---|---|---|---|---|---|---|---|---|---|---|---|---|---|---|---|
|  | Abrasion resistance | ○ | ○ | ○ | ○ | ○ | ○ | ○ | ○ | ○ | ○ | ○ | ○ | ○ | ○ |
|  | Impact resistance | ○ | ○ | ○ | ○ | ○ | ○ | ○ | ○ | ○ | ○ | ○ | ○ | ○ | ○ |
|  | Weatherability (SWOM) | ○ | ○ | ○ | ○ | ○ | ○ | ○ | ○ | ○ | ○ | ○ | ○ | ○ | ○ |
| Overall evaluation |  | ○ | ○ | ○ | ○ | ○ | ○ | ○ | ○ | ○ | ○ | ○ | ○ | ○ | ○ |

TABLE 6

| | | | | | Comparative Examples | | | | | | | | |
|---|---|---|---|---|---|---|---|---|---|---|---|---|---|
| | | | | | 17 | 18 | 19 | 20 | 21 | 22 | 23 | 24 | 25 |
| (A) | | Trifunctional | Bifunctional | | | | | | | | | | |
| | Mixture of tris(2-acryloylethyl) isocyanurate and bis(2-acryloylethyl) isocyanurate | 90<br>75 | 10<br>25 | | 20 | 60 | 60 | 86 | 40 | 40 | 60 | | |
| | Trimethylolpropane triacrylate | 100 | | | | | | | | | | 60 | |
| | Urethane acrylate (1) | 100 | | | | | | | | | | | 60 |
| (B) | | Number of functional groups | | | | | | | | | | | |
| | Dipentaerythritol hexaacrylate | 6 | | | 38 | 5 | 31 | 5 | 46 | 10 | 18 | 18 | 18 |
| | Ditrimethylolpropane tetraacrylate | 4 | | | | | | | | | | | |
| | Pentaerythritol tetraacrylate | 4 | | | | | | | | | | | |
| | Trimethylolpropane triacrylate | 3 | | | | | | | | | | | |
| (C) | | Mw | SP | Tg | | | | | | | | | |
| | Acrylic resin-A | 5200 | 10.5 | 71 | 38 | 31 | 5 | 5 | 10 | 46 | 18 | 18 | 18 |
| | Acrylic resin-B | 14800 | 9.3 | 72 | | | | | | | | | |
| | Acrylic resin-C | 15100 | 10.4 | 51 | | | | | | | | | |
| | Acrylic resin-D | 15000 | 10.5 | 70 | | | | | | | | | |
| | Acrylic resin-E | 14900 | 10.6 | 101 | | | | | | | | | |
| | Acrylic resin-F | 15100 | 10.9 | 72 | | | | | | | | | |
| | Acrylic resin-G | 29800 | 10.5 | 70 | | | | | | | | | |
| | Acrylic resin-H | 3800 | 10.4 | 71 | | | | | | | | | |
| | Acrylic resin-I | 41000 | 10.6 | 71 | | | | | | | | | |
| | Acrylic resin-J | 15000 | 8.9 | 72 | | | | | | | | | |
| | Acrylic resin-K | 15200 | 11.6 | 71 | | | | | | | | | |
| (E) | | | | | | | | | | | | | |
| | 1,9-Nonanediol diacrylate | | | | 4 | 4 | 4 | 4 | 4 | 4 | 4 | 4 | 4 |
| | 1,10-Decanediol diacrylate | | | | | | | | | | | | |
| | Octadecane-1,12-diol diacrylate | | | | | | | | | | | | |
| | 1,6-Hexanediol diacrylate | | | | | | | | | | | | |
| | Tricyclodecanedimethanol diacrylate | | | | | | | | | | | | |
| | Total amount of components (A) to (C) and (E) | | | | 100 | 100 | 100 | 100 | 100 | 100 | 100 | 100 | 100 |
| (D) | Carbon black | | | | 1 | 1 | 1 | 1 | 1 | 1 | 0 | 1 | 1 |
| (G) | 2-Hydroxy-2-methylpropiophenone | | | | 5 | 5 | 5 | 5 | 5 | 5 | 5 | 5 | 5 |
| Evaluation | Curability (surface tacking) | | | | ○ | ○ | ○ | ○ | ○ | ○ | ○ | ○ | ○ |
| | Coating film appearance (hiding subsurface property) | | | | ○ | ○ | ○ | ○ | ○ | ○ | x | ○ | ○ |
| | Coating film appearance (smoothness) | | | | ○ | ○ | ○ | ○ | ○ | ○ | ○ | ○ | x |
| | Abrasion resistance | | | | ○ | x | ○ | x | ○ | x | ○ | x | ○ |
| | Impact resistance | | | | ○ | ○ | x | x | x | ○ | ○ | ○ | ○ |
| | Weatherability (SWOM) | | | | x | ○ | ○ | ○ | ○ | ○ | ○ | x | ○ |
| Overall evaluation | | | | | x | x | x | x | x | x | x | x | x |

| | | | | Comparative Examples | | | | |
|---|---|---|---|---|---|---|---|---|
| | | | | 26 | 27 | 28 | 29 | 30 |
| (A) | | Trifunctional | Bifunctional | | | | | |
| | Mixture of tris(2-acryloylethyl) isocyanurate and bis(2-acryloylethyl) isocyanurate | 90<br>75 | 10<br>25 | 60 | 60 | 60 | 60 | 60 |
| | Trimethylolpropane triacrylate | 100 | | | | | | |
| | Urethane acrylate (1) | 100 | | | | | | |

TABLE 6-continued

| (B) | | Number of functional groups | | | | | |
|---|---|---|---|---|---|---|---|
| | Dipentaerythritol hexaacrylate | 6 | | 18 | 18 | 18 | 18 |
| | Ditrimethylolpropane tetraacrylate | 4 | | | | | |
| | Pentaerythritol tetraacrylate | 4 | | | | | |
| | Trimethylolpropane triacrylate | 3 | 18 | | | | |
| (C) | | Mw | SP | Tg | | | |
| | Acrylic resin-A | 5200 | 10.5 | 71 | 18 | | | |
| | Acrylic resin-B | 14800 | 9.3 | 72 | | | | |
| | Acrylic resin-C | 15100 | 10.4 | 51 | | | | |
| | Acrylic resin-D | 15000 | 10.5 | 70 | | | | |
| | Acrylic resin-E | 14900 | 10.6 | 101 | | | | |
| | Acrylic resin-F | 15100 | 10.9 | 72 | | | | |
| | Acrylic resin-G | 29800 | 10.5 | 70 | | | | |
| | Acrylic resin-H | 3800 | 10.4 | 71 | | 18 | | |
| | Acrylic resin-I | 41000 | 10.6 | 71 | | | 18 | |
| | Acrylic resin-J | 15000 | 8.9 | 72 | | | | 18 | |
| | Acrylic resin-K | 15200 | 11.6 | 71 | | | | | 18 |
| (E) | 1,9-Nonanediol diacrylate | | | | 4 | 4 | 4 | 4 | 4 |
| | 1,10-Decanediol diacrylate | | | | | | | | |
| | Octadecane-1,12-diol diacrylate | | | | | | | | |
| | 1,6-Hexanediol diacrylate | | | | | | | | |
| | Tricyclodecanedimethanol diacrylate | | | | | | | | |
| | Total amount of components (A) to (C) and (E) | | | | 100 | 100 | 100 | 100 | 100 |
| (D) | Carbon black | | | | 1 | 1 | 1 | 1 | 1 |
| (G) | 2-Hydroxy-2-methylpropiophenone | | | | 5 | 5 | 5 | 5 | 5 |
| Evaluation | Curability (surface tacking) | | | | ○ | ○ | ○ | ○ | ○ |
| | Coating film appearance (hiding subsurface property) | | | | ○ | ○ | ○ | ○ | ○ |
| | Coating film appearance (smoothness) | | | | ○ | ○ | × | × | × |
| | Abrasion resistance | | | | × | ○ | × | ○ | ○ |
| | Impact resistance | | | | ○ | × | ○ | × | × |
| | Weatherability (SWOM) | | | | × | × | ○ | × | × |
| Overall evaluation | | | | | × | × | × | × | × |

TABLE 7

| | | | | Example | | | | | | | |
|---|---|---|---|---|---|---|---|---|---|---|---|
| | | | | 45 | 46 | 47 | 48 | 49 | 50 | 51 | 52 |
| (A) | | Trifunctional | Bifunctional | | | | | | | | |
| | Mixture of tris(2-acryloylethyl) isocyanurate and bis(2-acryloylethyl) isocyanurate | 90 | 10 | 40 | 60 | 76 | 60 | 60 | 46 | 46 | 60 |
| | | 75 | 25 | | | | | | | | |
| | Trimethylolpropane triacrylate | 100 | | | | | | | | | |
| | Urethane acrylate (1) | 100 | | | | | | | | | |
| (B) | | Number of functional groups | | | | | | | | | |
| | Dipentaerythritol hexaacrylate | 6 | | 28 | 18 | 10 | 10 | 26 | 40 | 10 | 15 |
| | Ditrimethylolpropane tetraacrylate | 4 | | | | | | | | | |
| | Pentaerythritol tetraacrylate | 4 | | | | | | | | | |
| | Trimethylolpropane triacrylate | 3 | | | | | | | | | |
| (C) | | Mw | SP | Tg | | | | | | | |
| | Acrylic resin-A | 5200 | 10.5 | 71 | 28 | 18 | 10 | 26 | 10 | 10 | 40 | 15 |
| | Acrylic resin-B | 14800 | 9.3 | 72 | | | | | | | | |
| | Acrylic resin-C | 15100 | 10.4 | 51 | | | | | | | | |
| | Acrylic resin-D | 15000 | 10.5 | 70 | | | | | | | | |
| | Acrylic resin-E | 14900 | 10.6 | 101 | | | | | | | | |
| | Acrylic resin-F | 15100 | 10.9 | 72 | | | | | | | | |
| | Acrylic resin-G | 29800 | 10.5 | 70 | | | | | | | | |
| | Acrylic resin-H | 3800 | 10.4 | 71 | | | | | | | | |
| | Acrylic resin-I | 41000 | 10.6 | 71 | | | | | | | | |
| | Acrylic resin-J | 15000 | 8.9 | 72 | | | | | | | | |
| | Acrylic resin-K | 15200 | 11.6 | 71 | | | | | | | | |
| (F) | | Number of functional groups | | | | | | | | | |
| | Urethane acrylate (1) | 3 | | 4 | 4 | 4 | 4 | 4 | 4 | 4 | 10 |
| | Urethane acrylate (2) | 6 | | | | | | | | | |
| | Urethane acrylate (3) | 9 | | | | | | | | | |
| | Urethane acrylate (4) | 15 | | | | | | | | | |

TABLE 7-continued

| | | | | | | | | | | |
|---|---|---|---|---|---|---|---|---|---|---|
| | Urethane acrylate (5) | 3 | | | | | | | | |
| | Urethane acrylate (6) | 15 | | | | | | | | |
| | Urethane acrylate (7) | 2 | | | | | | | | |
| | Urethane acrylate (8) | 6 | | | | | | | | |
| | Urethane acrylate (9) | 2 | | | | | | | | |
| | Urethane acrylate (10) | 6 | | | | | | | | |
| | Total amount of components (A) to (C) and (F) | | 100 | 100 | 100 | 100 | 100 | 100 | 100 | 100 |
| (D) | Carbon black | | 1 | 1 | 1 | 1 | 1 | 1 | 1 | 1 |
| (G) | 2-Hydroxy-2-methylpropiophenone | | 5 | 5 | 5 | 5 | 5 | 5 | 5 | 5 |
| Evaluation | Curability (surface tacking) | | ○ | ○ | ○ | ○ | ○ | ○ | ○ | ○ |
| | Coating film appearance (hiding subsurface property) | | ○ | ○ | ○ | ○ | ○ | ○ | ○ | ○ |
| | Coating film appearance (smoothness) | | ○ | ○ | ○ | ○ | ○ | ○ | ○ | ○ |
| | Abrasion resistance | | ○ | ○ | ○ | ○ | ○ | ○ | ○ | ○ |
| | Impact resistance | | ○ | ○ | ○ | ○ | ○ | ○ | ○ | ○ |
| | Weatherability (SWOM) | | ○ | ○ | ○ | ○ | ○ | ○ | ○ | ○ |
| Overall evaluation | | | ○ | ○ | ○ | ○ | ○ | ○ | ○ | ○ |

| | | | | | Example | | | | | |
|---|---|---|---|---|---|---|---|---|---|---|
| | | | | | 53 | 54 | 55 | 56 | 57 | 58 |
| (A) | | | Trifunctional | Bifunctional | | | | | | |
| | Mixture of tris(2-acryloylethyl) isocyanurate and bis(2-acryloylethyl) isocyanurate | | 90 | 10 | 60 | 60 | 60 | 60 | | 60 |
| | | | 75 | 25 | | | | | 60 | |
| | Trimethylolpropane triacrylate | | 100 | | | | | | | |
| | Urethane acrylate (1) | | | 100 | | | | | | |
| (B) | | | Number of functional groups | | | | | | | |
| | Dipentaerythritol hexaacrylate | | 6 | | 18 | 18 | 18 | 18 | 18 | |
| | Ditrimethylolpropane tetraacrylate | | 4 | | | | | | | 18 |
| | Pentaerythritol tetraacrylate | | 4 | | | | | | | |
| | Trimethylolpropane triacrylate | | 3 | | | | | | | |
| (C) | | | Mw | SP | Tg | | | | | |
| | Acrylic resin-A | | 5200 | 10.5 | 71 | 18 | 18 | 18 | 18 | 18 | 18 |
| | Acrylic resin-B | | 14800 | 9.3 | 72 | | | | | | |
| | Acrylic resin-C | | 15100 | 10.4 | 51 | | | | | | |
| | Acrylic resin-D | | 15000 | 10.5 | 70 | | | | | | |
| | Acrylic resin-E | | 14900 | 10.6 | 101 | | | | | | |
| | Acrylic resin-F | | 15100 | 10.9 | 72 | | | | | | |
| | Acrylic resin-G | | 29800 | 10.5 | 70 | | | | | | |
| | Acrylic resin-H | | 3800 | 10.4 | 71 | | | | | | |
| | Acrylic resin-I | | 41000 | 10.6 | 71 | | | | | | |
| | Acrylic resin-J | | 15000 | 8.9 | 72 | | | | | | |
| | Acrylic resin-K | | 15200 | 11.6 | 71 | | | | | | |
| (F) | | | Number of functional groups | | | | | | | |
| | Urethane acrylate (1) | | 3 | | 4 | 4 | 4 | 4 | 4 | 4 |
| | Urethane acrylate (2) | | 6 | | | | | | | |
| | Urethane acrylate (3) | | 9 | | | | | | | |
| | Urethane acrylate (4) | | 15 | | | | | | | |
| | Urethane acrylate (5) | | 3 | | | | | | | |
| | Urethane acrylate (6) | | 15 | | | | | | | |
| | Urethane acrylate (7) | | 2 | | | | | | | |
| | Urethane acrylate (8) | | 6 | | | | | | | |
| | Urethane acrylate (9) | | 2 | | | | | | | |
| | Urethane acrylate (10) | | 6 | | | | | | | |
| | Total amount of components (A) to (C) and (F) | | | | 100 | 100 | 100 | 100 | 100 | 100 |
| (D) | Carbon black | | | | 0.001 | 5 | 1 | 1 | 1 | 1 |
| (G) | 2-Hydroxy-2-methylpropiophenone | | | | 5 | 5 | 1 | 10 | 5 | 5 |
| Evaluation | Curability (surface tacking) | | | | ○ | ○ | ○ | ○ | ○ | ○ |
| | Coating film appearance (hiding subsurface property) | | | | ○ | ○ | ○ | ○ | ○ | ○ |
| | Coating film appearance (smoothness) | | | | ○ | ○ | ○ | ○ | ○ | ○ |
| | Abrasion resistance | | | | ○ | ○ | ○ | ○ | ○ | ○ |
| | Impact resistance | | | | ○ | ○ | ○ | ○ | ○ | ○ |
| | Weatherability (SWOM) | | | | ○ | ○ | ○ | ○ | ○ | ○ |
| Overall evaluation | | | | | ○ | ○ | ○ | ○ | ○ | ○ |

TABLE 8

|  |  |  |  | Example | | | | | | | | |
|---|---|---|---|---|---|---|---|---|---|---|---|---|
|  |  |  |  | 59 | 60 | 61 | 62 | 63 | 64 | 65 | 66 | 67 |
| (A) |  | Trifunctional | Bifunctional |  |  |  |  |  |  |  |  |  |
|  | Mixture of tris(2-acryloylethyl) isocyanurate and bis(2-acryloylethyl) isocyanurate | 90 75 | 10 25 | 60 | 60 | 60 | 60 | 60 | 60 | 60 | 60 | 60 |
|  | Trimethylolpropane triacrylate | 100 |  |  |  |  |  |  |  |  |  |  |
|  | Urethane acrylate (1) | 100 |  |  |  |  |  |  |  |  |  |  |
| (B) |  | Number of functional groups |  |  |  |  |  |  |  |  |  |  |
|  | Dipentaerythritol hexaacrylate | 6 |  |  | 18 | 18 | 18 | 18 | 18 | 18 | 18 | 18 |
|  | Ditrimethylolpropane tetraacrylate | 4 |  |  |  |  |  |  |  |  |  |  |
|  | Pentaerythritol tetraacrylate | 4 |  | 18 |  |  |  |  |  |  |  |  |
|  | Trimethylolpropane triacrylate | 3 |  |  |  |  |  |  |  |  |  |  |
| (C) |  | Mw | SP | Tg |  |  |  |  |  |  |  |  |
|  | Acrylic resin-A | 5200 | 10.5 | 71 | 18 |  |  |  |  |  |  | 18 | 18 |
|  | Acrylic resin-B | 14800 | 9.3 | 72 |  | 18 |  |  |  |  |  |  |  |
|  | Acrylic resin-C | 15100 | 10.4 | 51 |  |  | 18 |  |  |  |  |  |  |
|  | Acrylic resin-D | 15000 | 10.5 | 70 |  |  |  | 18 |  |  |  |  |  |
|  | Acrylic resin-E | 14900 | 10.6 | 101 |  |  |  |  | 18 |  |  |  |  |
|  | Acrylic resin-F | 15100 | 10.9 | 72 |  |  |  |  |  | 18 |  |  |  |
|  | Acrylic resin-G | 29800 | 10.5 | 70 |  |  |  |  |  |  | 18 |  |  |
|  | Acrylic resin-H | 3800 | 10.4 | 71 |  |  |  |  |  |  |  |  |  |
|  | Acrylic resin-I | 41000 | 10.6 | 71 |  |  |  |  |  |  |  |  |  |
|  | Acrylic resin-J | 15000 | 8.9 | 72 |  |  |  |  |  |  |  |  |  |
|  | Acrylic resin-K | 15200 | 11.6 | 71 |  |  |  |  |  |  |  |  |  |
| (F) |  | Number of functional groups |  |  |  |  |  |  |  |  |  |  |
|  | Urethane acrylate (1) | 3 |  | 4 | 4 | 4 | 4 | 4 | 4 | 4 |  |  |
|  | Urethane acrylate (2) | 6 |  |  |  |  |  |  |  |  | 4 |  |
|  | Urethane acrylate (3) | 9 |  |  |  |  |  |  |  |  |  | 4 |
|  | Urethane acrylate (4) | 15 |  |  |  |  |  |  |  |  |  |  |
|  | Urethane acrylate (5) | 3 |  |  |  |  |  |  |  |  |  |  |
|  | Urethane acrylate (6) | 15 |  |  |  |  |  |  |  |  |  |  |
|  | Urethane acrylate (7) | 2 |  |  |  |  |  |  |  |  |  |  |
|  | Urethane acrylate (8) | 6 |  |  |  |  |  |  |  |  |  |  |
|  | Urethane acrylate (9) | 2 |  |  |  |  |  |  |  |  |  |  |
|  | Urethane acrylate (10) | 6 |  |  |  |  |  |  |  |  |  |  |
|  | Total amount of components (A) to (C) and (F) |  |  | 100 | 100 | 100 | 100 | 100 | 100 | 100 | 100 | 100 |
| (D) | Carbon black |  |  | 1 | 1 | 1 | 1 | 1 | 1 | 1 | 1 | 1 |
| (G) | 2-Hydroxy-2-methylpropiophenone |  |  | 5 | 5 | 5 | 5 | 5 | 5 | 5 | 5 | 5 |
| Evaluation | Curability (surface tacking) |  |  | ○ | ○ | ○ | ○ | ○ | ○ | ○ | ○ | ○ |
|  | Coating film appearance (hiding subsurface property) |  |  | ○ | ○ | ○ | ○ | ○ | ○ | ○ | ○ | ○ |
|  | Coating film appearance (smoothness) |  |  | ○ | ○ | ○ | ○ | ○ | ○ | ○ | ○ | ○ |
|  | Abrasion resistance |  |  | ○ | ○ | ○ | ○ | ○ | ○ | ○ | ○ | ○ |
|  | Impact resistance |  |  | ○ | ○ | ○ | ○ | ○ | ○ | ○ | ○ | ○ |
|  | Weatherability (SWOM) |  |  | ○ | ○ | ○ | ○ | ○ | ○ | ○ | ○ | ○ |
| Overall evaluation |  |  |  | ○ | ○ | ○ | ○ | ○ | ○ | ○ | ○ | ○ |

|  |  |  |  | Example | | | | | | |
|---|---|---|---|---|---|---|---|---|---|---|
|  |  |  |  | 68 | 69 | 70 | 71 | 72 | 73 | 74 |
| (A) |  | Trifunctional | Bifunctional |  |  |  |  |  |  |  |
|  | Mixture of tris(2-acryloylethyl) isocyanurate and bis(2-acryloylethyl) isocyanurate | 90 75 | 10 25 | 60 | 60 | 60 | 60 | 60 | 60 | 60 |
|  | Trimethylolpropane triacrylate | 100 |  |  |  |  |  |  |  |  |
|  | Urethane acrylate (1) | 100 |  |  |  |  |  |  |  |  |
| (B) |  | Number of functional groups |  |  |  |  |  |  |  |  |
|  | Dipentaerythritol hexaacrylate | 6 |  | 18 | 18 | 18 | 18 | 18 | 18 | 18 |
|  | Ditrimethylolpropane tetraacrylate | 4 |  |  |  |  |  |  |  |  |
|  | Pentaerythritol tetraacrylate | 4 |  |  |  |  |  |  |  |  |
|  | Trimethylolpropane triacrylate | 3 |  |  |  |  |  |  |  |  |
| (C) |  | Mw | SP | Tg |  |  |  |  |  |  |
|  | Acrylic resin-A | 5200 | 10.5 | 71 | 18 | 18 | 18 | 18 | 18 | 18 | 18 |
|  | Acrylic resin-B | 14800 | 9.3 | 72 |  |  |  |  |  |  |  |
|  | Acrylic resin-C | 15100 | 10.4 | 51 |  |  |  |  |  |  |  |
|  | Acrylic resin-D | 15000 | 10.5 | 70 |  |  |  |  |  |  |  |
|  | Acrylic resin-E | 14900 | 10.6 | 101 |  |  |  |  |  |  |  |

TABLE 8-continued

|  |  |  |  |  |  |  |  |  |  |
|---|---|---|---|---|---|---|---|---|---|
|  | Acrylic resin-F | 15100 | 10.9 | 72 |  |  |  |  |  |
|  | Acrylic resin-G | 29800 | 10.5 | 70 |  |  |  |  |  |
|  | Acrylic resin-H | 3800 | 10.4 | 71 |  |  |  |  |  |
|  | Acrylic resin-I | 41000 | 10.6 | 71 |  |  |  |  |  |
|  | Acrylic resin-J | 15000 | 8.9 | 72 |  |  |  |  |  |
|  | Acrylic resin-K | 15200 | 11.6 | 71 |  |  |  |  |  |
| (F) |  | Number of functional groups |  |  |  |  |  |  |  |
|  | Urethane acrylate (1) | 3 |  |  |  |  |  |  |  |
|  | Urethane acrylate (2) | 6 |  |  |  |  |  |  |  |
|  | Urethane acrylate (3) | 9 |  |  |  |  |  |  |  |
|  | Urethane acrylate (4) | 15 |  |  | 4 |  |  |  |  |  |
|  | Urethane acrylate (5) | 3 |  |  |  | 4 |  |  |  |  |
|  | Urethane acrylate (6) | 15 |  |  |  |  | 4 |  |  |  |
|  | Urethane acrylate (7) | 2 |  |  |  |  |  | 4 |  |  |
|  | Urethane acrylate (8) | 6 |  |  |  |  |  |  | 4 |  |
|  | Urethane acrylate (9) | 2 |  |  |  |  |  |  |  | 4 |  |
|  | Urethane acrylate (10) | 6 |  |  |  |  |  |  |  |  | 4 |
|  | Total amount of components (A) to (C) and (F) |  |  |  | 100 | 100 | 100 | 100 | 100 | 100 | 100 |
| (D) | Carbon black |  |  |  | 1 | 1 | 1 | 1 | 1 | 1 | 1 |
| (G) | 2-Hydroxy-2-methylpropiophenone |  |  |  | 5 | 5 | 5 | 5 | 5 | 5 | 5 |
| Evaluation | Curability (surface tacking) |  |  |  | ○ | ○ | ○ | ○ | ○ | ○ | ○ |
|  | Coating film appearance (hiding subsurface property) |  |  |  | ○ | ○ | ○ | ○ | ○ | ○ | ○ |
|  | Coating film appearance (smoothness) |  |  |  | ○ | ○ | ○ | ○ | ○ | ○ | ○ |
|  | Abrasion resistance |  |  |  | ○ | ○ | ○ | ○ | ○ | ○ | ○ |
|  | Impact resistance |  |  |  | ○ | ○ | ○ | ○ | ○ | ○ | ○ |
|  | Weatherability (SWOM) |  |  |  | ○ | ○ | ○ | ○ | ○ | ○ | ○ |
| Overall evaluation |  |  |  |  | ○ | ○ | ○ | ○ | ○ | ○ | ○ |

TABLE 9

|  |  |  |  |  | Comparative Examples |  |  |  |  |  |  |  |  |
|---|---|---|---|---|---|---|---|---|---|---|---|---|---|
|  |  |  |  |  | 31 | 32 | 33 | 34 | 35 | 36 | 37 | 38 | 39 |
| (A) |  | Trifunctional | Bifunctional |  |  |  |  |  |  |  |  |  |  |
|  | Mixture of tris(2-acryloylethyl) isocyanurate and bis(2-acryloylethyl) isocyanurate | 90 75 | 10 25 |  | 20 | 60 | 60 | 86 | 40 | 40 | 60 |  |  |
|  | Trimethylolpropane triacrylate | 100 |  |  |  |  |  |  |  |  |  |  | 60 |
|  | Urethane acrylate (1) | 100 |  |  |  |  |  |  |  |  |  |  |  |
| (B) |  | Number of functional groups |  |  |  |  |  |  |  |  |  |  |  |
|  | Dipentaerythritol hexaacrylate | 6 |  |  | 38 | 5 | 31 | 5 | 46 | 10 | 18 | 18 | 18 |
|  | Ditrimethylolpropane tetraacrylate | 4 |  |  |  |  |  |  |  |  |  |  |  |
|  | Pentaerythritol tetraacrylate | 4 |  |  |  |  |  |  |  |  |  |  |  |
|  | Trimethylolpropane triacrylate | 3 |  |  |  |  |  |  |  |  |  |  |  |
| (C) |  | Mw | SP | Tg |  |  |  |  |  |  |  |  |  |
|  | Acrylic resin-A | 5200 | 10.5 | 71 | 38 | 31 | 5 | 5 | 10 | 46 | 18 | 18 | 18 |
|  | Acrylic resin-B | 14800 | 9.3 | 72 |  |  |  |  |  |  |  |  |  |
|  | Acrylic resin-C | 15100 | 10.4 | 51 |  |  |  |  |  |  |  |  |  |
|  | Acrylic resin-D | 15000 | 10.5 | 70 |  |  |  |  |  |  |  |  |  |
|  | Acrylic resin-E | 14900 | 10.6 | 101 |  |  |  |  |  |  |  |  |  |
|  | Acrylic resin-F | 15100 | 10.9 | 72 |  |  |  |  |  |  |  |  |  |
|  | Acrylic resin-G | 29800 | 10.5 | 70 |  |  |  |  |  |  |  |  |  |
|  | Acrylic resin-H | 3800 | 10.4 | 71 |  |  |  |  |  |  |  |  |  |
|  | Acrylic resin-I | 41000 | 10.6 | 71 |  |  |  |  |  |  |  |  |  |
|  | Acrylic resin-J | 15000 | 8.9 | 72 |  |  |  |  |  |  |  |  |  |
|  | Acrylic resin-K | 15200 | 11.6 | 71 |  |  |  |  |  |  |  |  |  |
| (F) |  | Number of functional groups |  |  |  |  |  |  |  |  |  |  |  |
|  | Urethane acrylate (1) | 3 |  |  | 4 | 4 | 4 | 4 | 4 | 4 | 4 | 4 | 4 |
|  | Urethane acrylate (2) | 6 |  |  |  |  |  |  |  |  |  |  |  |
|  | Urethane acrylate (3) | 9 |  |  |  |  |  |  |  |  |  |  |  |
|  | Urethane acrylate (4) | 15 |  |  |  |  |  |  |  |  |  |  |  |
|  | Urethane acrylate (5) | 3 |  |  |  |  |  |  |  |  |  |  |  |

TABLE 9-continued

|  |  |  |  |  |  |  |  |  |  |  |  |
|---|---|---|---|---|---|---|---|---|---|---|---|
|  | Urethane acrylate (6) | 15 |  |  |  |  |  |  |  |  |  |
|  | Urethane acrylate (7) | 2 |  |  |  |  |  |  |  |  |  |
|  | Urethane acrylate (8) | 6 |  |  |  |  |  |  |  |  |  |
|  | Urethane acrylate (9) | 2 |  |  |  |  |  |  |  |  |  |
|  | Urethane acrylate (10) | 6 |  |  |  |  |  |  |  |  |  |
|  | Total amount of components (A) to (C) and (F) |  | 100 | 100 | 100 | 100 | 100 | 100 | 100 | 100 | 100 |
| (D) | Carbon black |  | 1 | 1 | 1 | 1 | 1 | 1 | 1 | 1 | 1 |
| (G) | 2-Hydroxy-2-methylpropiophenone |  | 5 | 5 | 5 | 5 | 5 | 5 | 5 | 5 | 5 |
| Evaluation | Curability (surface tacking) |  | ○ | ○ | ○ | ○ | ○ | ○ | ○ | ○ | ○ |
|  | Coating film appearance (hiding subsurface property) |  | ○ | ○ | ○ | ○ | ○ | ○ | x | ○ | ○ |
|  | Coating film appearance (smoothness) |  | ○ | ○ | ○ | ○ | ○ | ○ | ○ | ○ | ○ |
|  | Abrasion resistance |  | ○ | x | ○ | x | ○ | x | ○ | x | x |
|  | Impact resistance |  | ○ | ○ | x | x | x | ○ | ○ | ○ | ○ |
|  | Weatherability (SWOM) |  | x | ○ | ○ | ○ | ○ | ○ | ○ | x | x |
| Overall evaluation |  |  | x | x | x | x | x | x | x | x | x |

|  |  |  |  | Comparative Examples |  |  |  |  |  |
|---|---|---|---|---|---|---|---|---|---|
|  |  |  |  | 40 | 41 | 42 | 43 | 44 | 45 |
| (A) |  | Trifunctional | Bifunctional |  |  |  |  |  |  |
|  | Mixture of tris(2-acryloylethyl) isocyanurate and bis(2-acryloylethyl) isocyanurate | 90 / 75 | 10 / 25 | 60 | 60 | 60 | 60 | 60 | 60 |
|  | Trimethylolpropane triacrylate | 100 |  |  |  |  |  |  |  |
|  | Urethane acrylate (1) | 100 |  | 60 |  |  |  |  |  |
| (B) |  | Number of functional groups |  |  |  |  |  |  |  |
|  | Dipentaerythritol hexaacrylate | 6 |  | 18 |  | 18 | 18 | 18 | 18 |
|  | Ditrimethylolpropane tetraacrylate | 4 |  |  |  |  |  |  |  |
|  | Pentaerythritol tetraacrylate | 4 |  |  |  |  |  |  |  |
|  | Trimethylolpropane triacrylate | 3 |  |  | 18 |  |  |  |  |
| (C) |  | Mw | SP | Tg |  |  |  |  |  |
|  | Acrylic resin-A | 5200 | 10.5 | 71 | 18 | 18 |  |  |  |  |
|  | Acrylic resin-B | 14800 | 9.3 | 72 |  |  |  |  |  |  |
|  | Acrylic resin-C | 15100 | 10.4 | 51 |  |  |  |  |  |  |
|  | Acrylic resin-D | 15000 | 10.5 | 70 |  |  |  |  |  |  |
|  | Acrylic resin-E | 14900 | 10.6 | 101 |  |  |  |  |  |  |
|  | Acrylic resin-F | 15100 | 10.9 | 72 |  |  |  |  |  |  |
|  | Acrylic resin-G | 29800 | 10.5 | 70 |  |  |  |  |  |  |
|  | Acrylic resin-H | 3800 | 10.4 | 71 |  |  | 18 |  |  |  |
|  | Acrylic resin-I | 41000 | 10.6 | 71 |  |  |  | 18 |  |  |
|  | Acrylic resin-J | 15000 | 8.9 | 72 |  |  |  |  | 18 |  |
|  | Acrylic resin-K | 15200 | 11.6 | 71 |  |  |  |  |  | 18 |
| (F) |  | Number of functional groups |  |  |  |  |  |  |  |
|  | Urethane acrylate (1) | 3 |  | 4 | 4 | 4 | 4 | 4 | 4 |
|  | Urethane acrylate (2) | 6 |  |  |  |  |  |  |  |
|  | Urethane acrylate (3) | 9 |  |  |  |  |  |  |  |
|  | Urethane acrylate (4) | 15 |  |  |  |  |  |  |  |
|  | Urethane acrylate (5) | 3 |  |  |  |  |  |  |  |
|  | Urethane acrylate (6) | 15 |  |  |  |  |  |  |  |
|  | Urethane acrylate (7) | 2 |  |  |  |  |  |  |  |
|  | Urethane acrylate (8) | 6 |  |  |  |  |  |  |  |
|  | Urethane acrylate (9) | 2 |  |  |  |  |  |  |  |
|  | Urethane acrylate (10) | 6 |  |  |  |  |  |  |  |
|  | Total amount of components (A) to (C) and (F) |  |  | 100 | 100 | 100 | 100 | 100 | 100 |
| (D) | Carbon black |  |  | 1 | 1 | 1 | 1 | 1 | 1 |
| (G) | 2-Hydroxy-2-methylpropiophenone |  |  | 5 | 5 | 5 | 5 | 5 | 5 |
| Evaluation | Curability (surface tacking) |  |  | ○ | ○ | ○ | ○ | ○ | ○ |
|  | Coating film appearance (hiding subsurface property) |  |  | ○ | ○ | ○ | ○ | ○ | ○ |
|  | Coating film appearance (smoothness) |  |  | x | ○ | ○ | x | x | x |
|  | Abrasion resistance |  |  | ○ | x | ○ | x | ○ | ○ |
|  | Impact resistance |  |  | ○ | ○ | x | ○ | x | x |
|  | Weatherability (SWOM) |  |  | ○ | x | x | ○ | x | x |
| Overall evaluation |  |  |  | x | x | x | x | x | x |

All of the active energy ray-curable coating compositions of Examples were confirmed to have a hiding subsurface property and be superior in coating film smoothness and superior in abrasion resistance, impact resistance, and weatherability.

The active energy ray-curable coating compositions of Comparative Examples 1 to 8, 17 to 22, and 31 to 36 are examples in which the amounts of the components (A) to (C) do not fall within the ranges according to the present invention. In these examples, it was confirmed that one or more evaluation results were poor.

Comparative Examples 9, 23, and 37 are examples that do not contain the at least one pigment (D) selected from the group consisting of a coloring pigment and a glitter pigment. In these examples, it was confirmed that the compositions did not have hiding subsurface property.

Comparative Examples 10 to 16, 24 to 30, and 39 to 45 are examples in which components different from the components (A), (B), and (C) in the present invention were used. In these examples, it was confirmed that one or more evaluation results were poor.

INDUSTRIAL APPLICABILITY

The active energy ray-curable coating composition of the present invention contains a specific resin component and at least one pigment (D) selected from the group consisting of a coloring pigment and a glitter pigment. By applying the active energy ray-curable coating composition of the present invention to an object to be coated and applying active energy rays, a coating film superior in hiding subsurface property and smoothness can be formed. The coating film thus obtained is also advantageous in that it is superior also in abrasion resistance and impact resistance. The active energy ray-curable coating composition of the present invention can be suitably used for coating, for example, components that constitute an automobile body, and the like.

The invention claimed is:

1. An active energy ray-curable coating composition comprising:
    a poly[(meth)acryloyloxyalkyl] isocyanurate (A),
    a polyfunctional (meth)acrylate (B) having 4 or more (meth)acrylate groups,
    an acrylic resin (C), and
    at least one pigment (D) selected from the group consisting of a coloring pigment and a glitter pigment,
    wherein the active energy ray-curable coating composition includes the component (A) in an amount of 40 to 80 parts by mass, the component (B) in an amount of 10 to 40 parts by mass, and the component (C) in an amount of 10 to 40 parts by mass per 100 parts by mass of the total amount of the components (A), (B) and (C), and
    the acrylic resin (C) has a weight-average molecular weight in the range of 5,000 to 30,000, and a solubility parameter in the range of 9.0 to 11.5.

2. The active energy ray-curable coating composition according to claim 1,
    wherein the amount of the pigment (D) contained in the active energy ray-curable coating composition is 0.0001 to 5 parts by mass per 100 parts by mass of the total amount of the components (A), (B) and (C).

3. The active energy ray-curable coating composition according to claim 1,
    wherein the active energy ray-curable coating composition further comprises urethane (meth)acrylate (E), and the active energy ray-curable coating composition includes the component (A) in an amount of 40 to 78 parts by mass, the component (B) in an amount of 10 to 40 parts by mass, the component (C) in an amount of 10 to 40 parts by mass, and the component (E) in an amount of 2 to 10 parts by mass per 100 parts by mass of the total amount of the components (A), (B), (C) and (E).

4. The active energy ray-curable coating composition according to claim 1,
    wherein the active energy ray-curable coating composition further comprises a di(meth)acrylate (F) having a saturated hydrocarbon group having 2 to 12 carbon atoms, and
    the active energy ray-curable coating composition includes the component (A) in an amount of 40 to 78 parts by mass, the component (B) in an amount of 10 to 40 parts by mass, the component (C) in an amount of 10 to 40 parts by mass, and the component (F) in an amount of 2 to 10 parts by mass per 100 parts by mass of the total amount of the components (A), (B), (C) and (F).

5. The active energy ray-curable coating composition according to claim 1, wherein the acrylic resin (C) has a glass transition temperature in the range of 50 to 110° C.

6. A method for forming a coating film comprising the step of applying the active energy ray-curable coating composition according to claim 1 to an object to be coated and applying active energy rays thereto,
    wherein the coating film formed via the above step has a thickness in the range of 15 to 45 µm.

7. The active energy ray-curable coating composition according to claim 2, wherein the acrylic resin (C) has a glass transition temperature in the range of 50 to 110° C.

8. The active energy ray-curable coating composition according to claim 3, wherein the acrylic resin (C) has a glass transition temperature in the range of 50 to 110° C.

9. The active energy ray-curable coating composition according to claim 4, wherein the acrylic resin (C) has a glass transition temperature in the range of 50 to 110° C.

10. A method for forming a coating film comprising the step of applying the active energy ray-curable coating composition according to claim 2 to an object to be coated and applying active energy rays thereto,
    wherein the coating film formed via the above step has a thickness in the range of 15 to 45 µm.

11. A method for forming a coating film comprising the step of applying the active energy ray-curable coating composition according to claim 3 to an object to be coated and applying active energy rays thereto,
    wherein the coating film formed via the above step has a thickness in the range of 15 to 45 µm.

12. A method for forming a coating film comprising the step of applying the active energy ray-curable coating composition according to claim 4 to an object to be coated and applying active energy rays thereto,
    wherein the coating film formed via the above step has a thickness in the range of 15 to 45 µm.

13. A method for forming a coating film comprising the step of applying the active energy ray-curable coating composition according to claim 5 to an object to be coated and applying active energy rays thereto,
    wherein the coating film formed via the above step has a thickness in the range of 15 to 45 µm.

* * * * *